US011558092B1

(12) United States Patent
Chisu et al.

(10) Patent No.: US 11,558,092 B1
(45) Date of Patent: Jan. 17, 2023

(54) DYNAMIC SELECTION AND USAGE OF MIMO ANTENNA ELEMENTS IN AN ELECTRONIC DEVICE AS A FUNCTION OF CORRELATION PATTERN

(71) Applicant: Motorola Mobility LLC, Chicago, IL (US)

(72) Inventors: Daniel C Chisu, Franklin Park, IL (US); Armin W Klomsdorf, Chicago, IL (US); Si Chen, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/551,013

(22) Filed: Dec. 14, 2021

(51) Int. Cl.
*H04B 7/04* (2017.01)
*H04B 7/06* (2006.01)
*H04B 7/0413* (2017.01)

(52) U.S. Cl.
CPC ......... *H04B 7/0615* (2013.01); *H04B 7/0413* (2013.01)

(58) Field of Classification Search
CPC ............................ H04B 7/0413; H04B 7/0404
See application file for complete search history.

(56) References Cited

U.S. PATENT DOCUMENTS

2014/0120991 A1* 5/2014 Wong ...................... H01Q 9/42
455/575.1

OTHER PUBLICATIONS

"Envelope Correlation Coefficient (ECC)", Unknown Publication Date but believed to be prior to filing of present application; Reviewed online Nov. 22, 2021 at https://www.antenna-theory.com/m/definitions/envelope-correlation-coefficient-ecc.php.

"Polarization Measurements", Antenna Polarization Measurements Unknown Publication date but believed to be prior to filing of present application; Reviewed online Dec. 1, 2021 at https://www.antenna-theory.com/measurements/polarization.php.

"ScientDirect—Quarter Wavelength", Unknown Exact Publication Date but believed to be prior to filing of present application; Viewed online Dec. 1, 2021 at https://www.sciencedirect.com/topics/engineering/quarter-wavelength.

* cited by examiner

*Primary Examiner* — Rahel Guarino
(74) *Attorney, Agent, or Firm* — Philip H. Burrus, IV

(57) ABSTRACT

An electronic device includes a multiple input, multiple output (MIMO) antenna array comprising a plurality of antenna elements configured for MIMO communication across a network. One or more sensors detect a triggering event altering a radiation correlation pattern between at least two antenna elements of the plurality of antenna elements. One or more processors then select, in response to the one or more sensors detecting the triggering event, a quantity of antenna elements from the plurality of antenna elements available for engagement in the MIMO communication across the network as a function of the radiation correlation pattern.

20 Claims, 10 Drawing Sheets

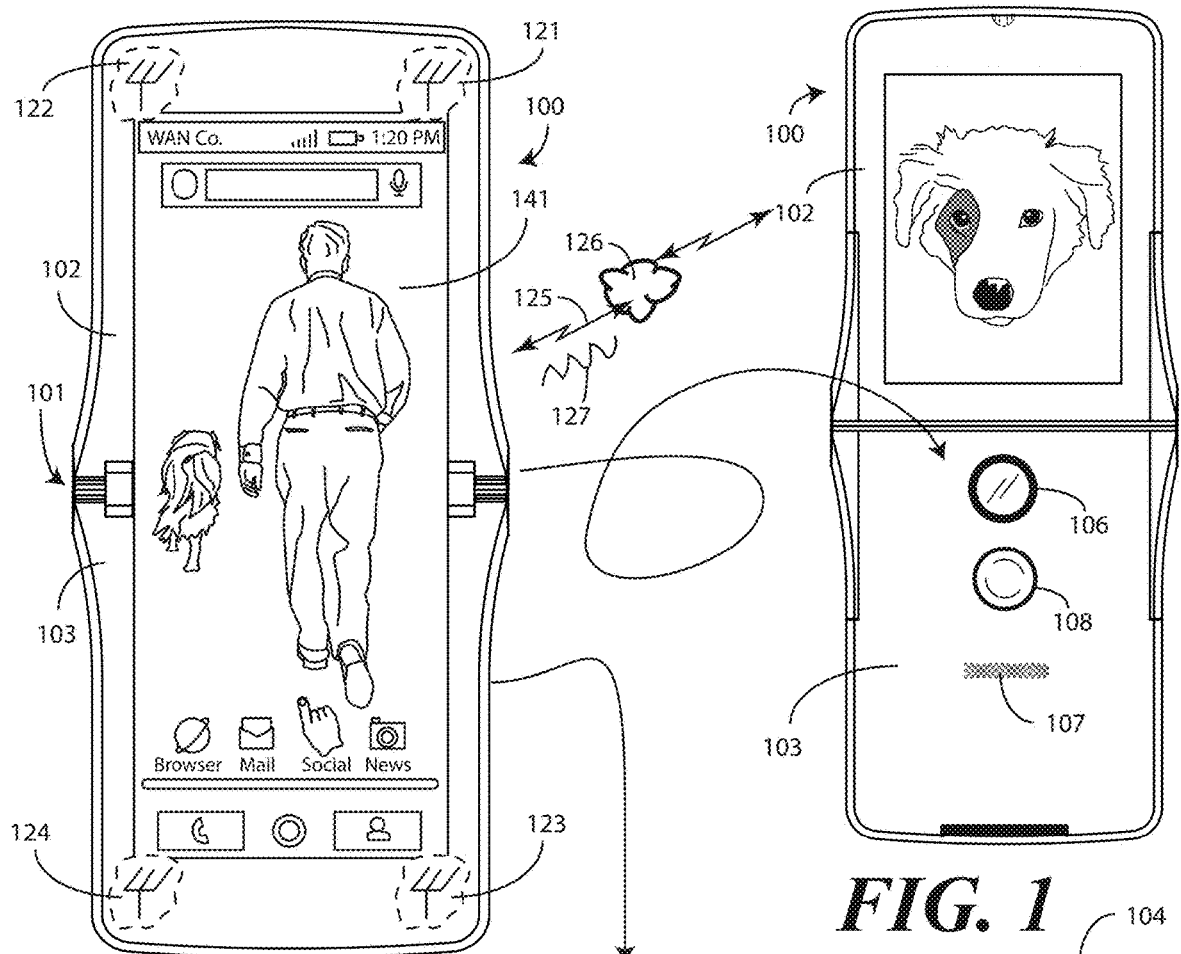
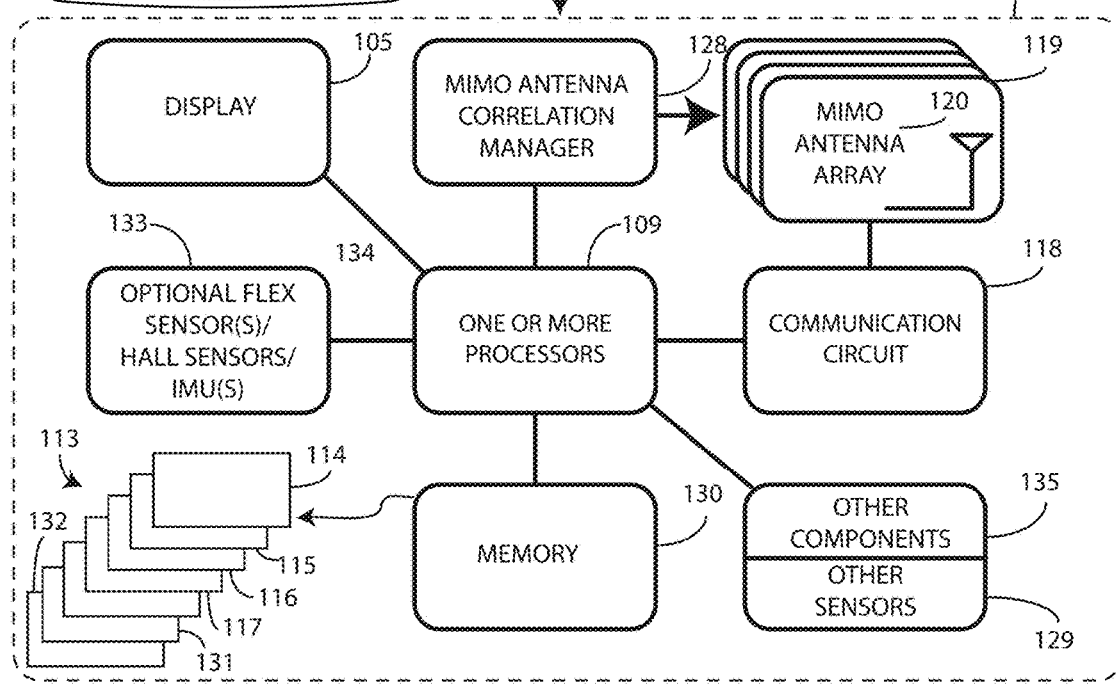
FIG. 1

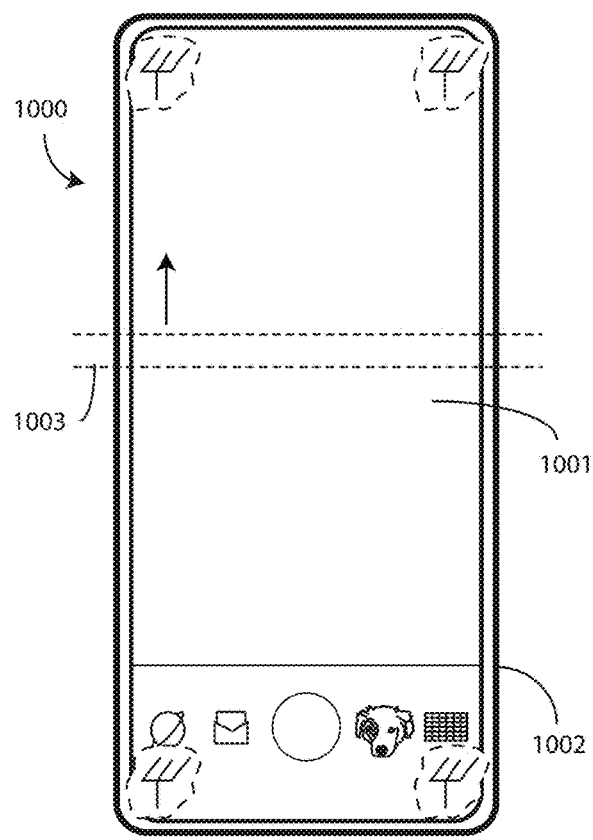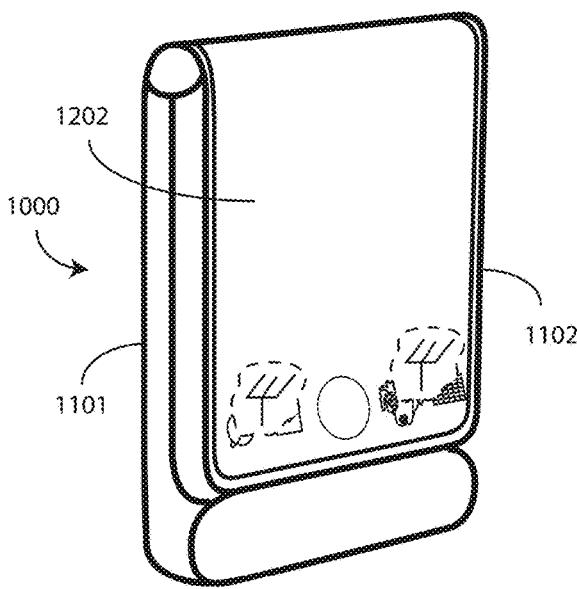
*FIG. 10*  *FIG. 11*

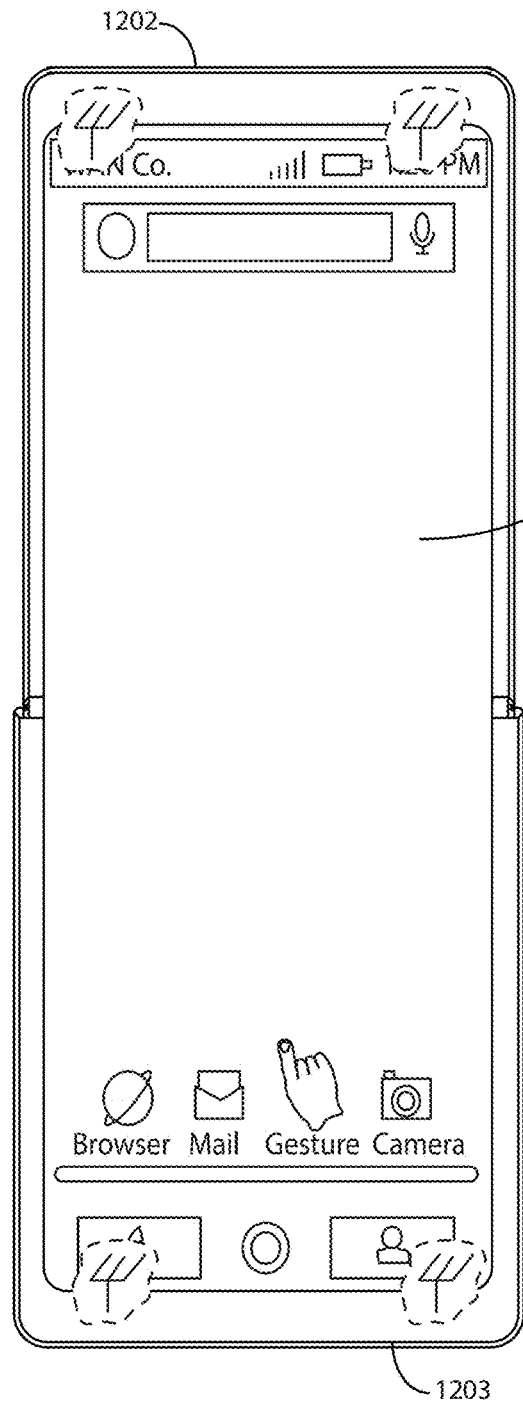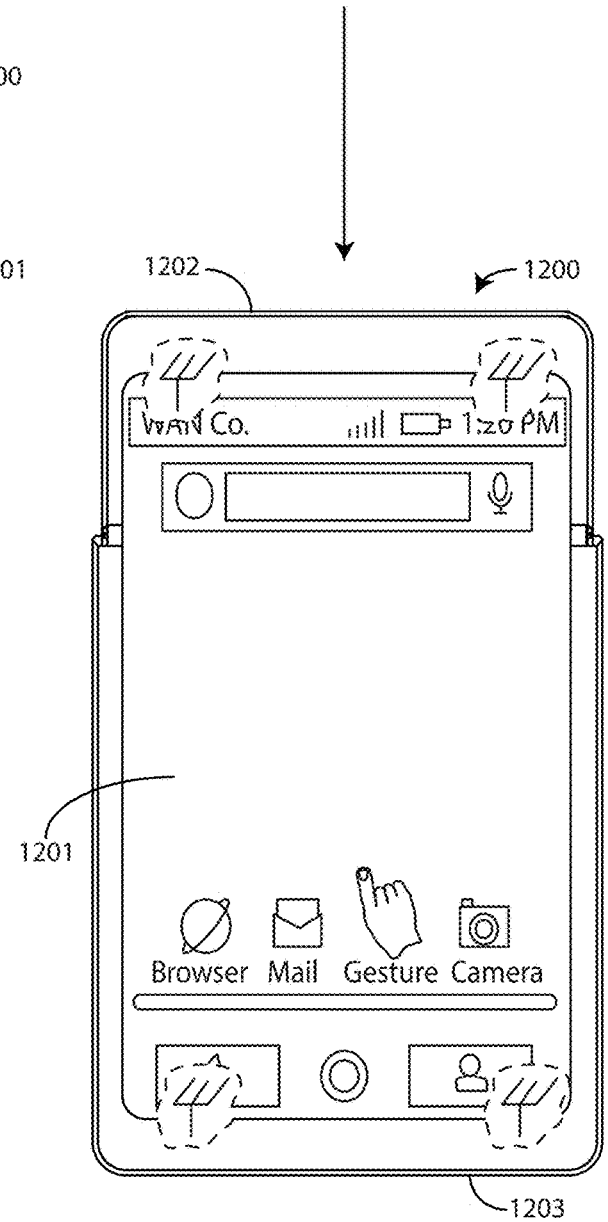
*FIG. 12*  *FIG. 13*

DYNAMIC SELECTION AND USAGE OF MIMO ANTENNA ELEMENTS IN AN ELECTRONIC DEVICE AS A FUNCTION OF CORRELATION PATTERN

BACKGROUND

Technical Field

This disclosure relates generally to electronic devices, and more particularly to electronic devices employing multiple input-multiple output (MIMO) antenna arrays.

Background Art

Portable electronic communication devices, especially smartphones, have become ubiquitous. People all over the world use such devices to stay connected. Many electronic devices today use MIMO antenna arrays to communicate across a network. While MIMO antenna arrays allow for incredibly fast data throughput rates when working optimally, their performance can degrade under certain conditions. This degradation results in a reduction of throughput and in increase in latency. These problems can occur in both the downlink and uplink directions and can result in increased current drain that reduces the effective run-time of the device. It would be advantageous to have an improved electronic device capable of mitigating such issues arising in conjunction with MIMO antenna array usage.

BRIEF DESCRIPTION OF THE DRAWINGS

FIG. 1 illustrates one explanatory electronic device in accordance with one or more embodiments of the disclosure.

FIG. 10 illustrates an alternate electronic device in accordance with one or more embodiments of the disclosure in an axially displaced open position.

FIG. 11 illustrates the alternate electronic device of FIG. 10 in a closed position.

FIG. 12 illustrates still another electronic device in accordance with one or more embodiments of the disclosure in an extended position.

FIG. 13 illustrates the electronic device of FIG. 12 in a closed position.

Figure 2:
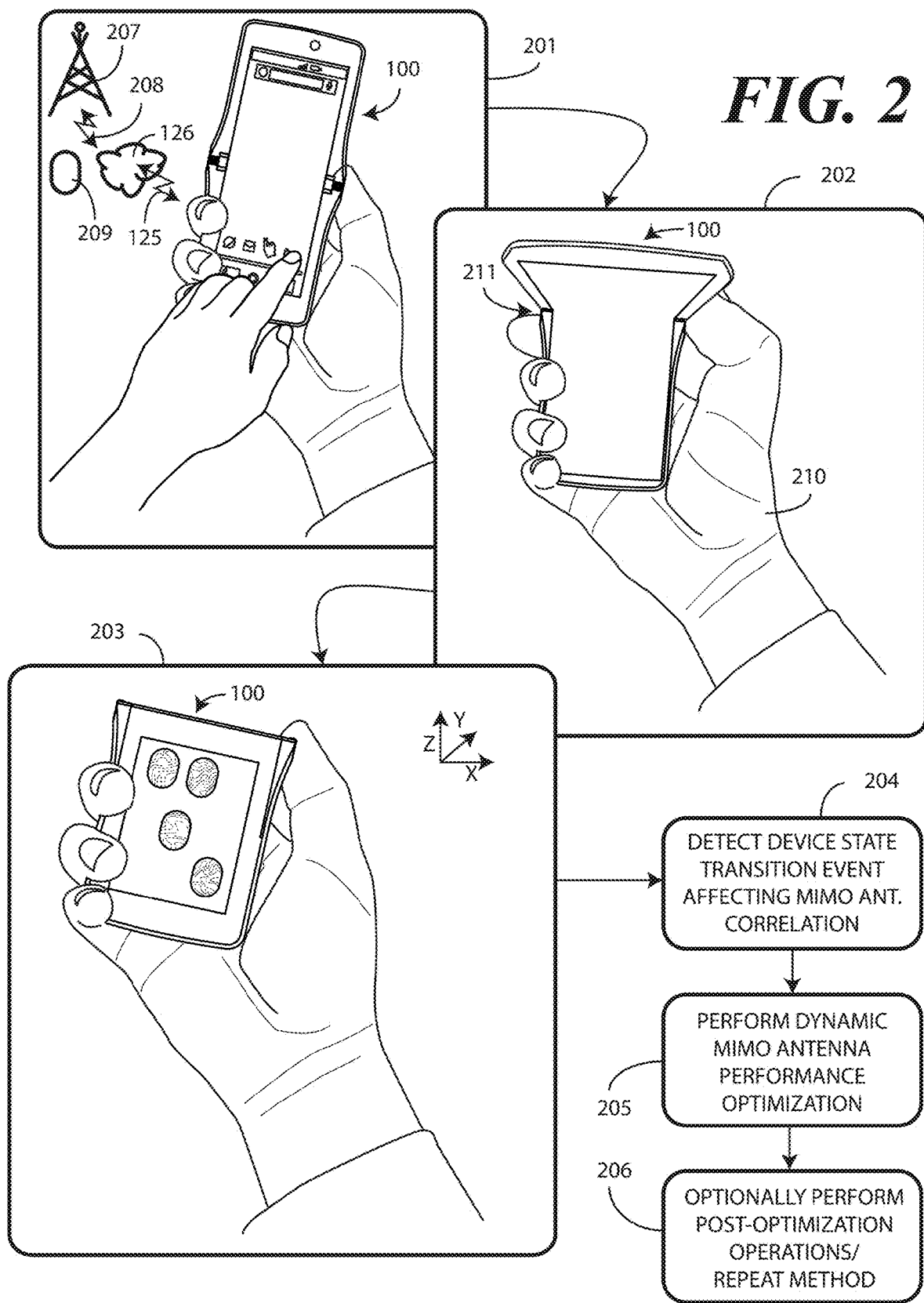
FIG. 2 illustrates one explanatory method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to selecting one or more antenna elements of a MIMO antenna array as a function of a changed radiation correlation pattern between at least two antenna elements occurring in response to a triggering event. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, solve problems specifically arising in the realm of radio frequency communications in the context of electronic device communication using MIMO antenna arrays to provide dynamic MIMO performance optimization based upon antenna correlations determined after a triggering event to improve the functioning of the electronic device itself by and improving the overall user experience.

It will be appreciated that embodiments of the disclosure described herein may be comprised of one or more conventional processors and unique stored program instructions that control the one or more processors to implement, in conjunction with certain non-processor circuits, some, most, or all of the functions of increasing a quantity of antenna elements selected from a plurality of antenna elements for use in MIMO communication across a network when a triggering event decreases radiation correlation patterns between at least two antenna elements of the plurality of antenna elements and decreasing the quantity of antenna elements for use in the MIMO communication across the network when the triggering event increases the radiation correlation patterns between the at least two antenna elements of the plurality of antenna elements as described herein. The non-processor circuits may include, but are not limited to, a radio receiver, a radio transmitter, signal drivers, clock circuits, power source circuits, and user input devices. As such, these functions may be interpreted as steps of a method to perform the increase in a quantity of antenna elements available to engage in MIMO communication when, for example, a deformable electronic device is in an axially displaced open position and decrease the quantity of antenna elements available to engage in the MIMO communication when the electronic device transitions to a closed position.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, the performance of a MIMO antenna array can degrade under certain conditions. When this occurs, a reduced "rank indicator" or "RI" value, which provides an indication of the number of independent vectors in the MIMO matrix, may become reduced. When the rank indicator decreases, the network in communication with the electronic device utilizing the degraded MIMO antenna array may reduce data block sizes being transmitted to the electronic device. This reduction in block size can cause throughput to decrease and latency to increase.

The situation can be further exacerbated when the antenna elements of the MIMO antenna array become highly correlated. Sometimes high radiation correlation patterns between antenna elements can even cancel out the MIMO functionality. Compounding matters, the issue may become worse (and harder to manage) when the number of antenna elements in a MIMO array increases. Embodiments of the disclosure contemplate that while current wireless standards are associated with electronic devices having MIMO antenna arrays having four antenna elements, future MIMO communication standards are likely to be operable with electronic devices employing six, eight, or more antenna elements in a MIMO antenna array.

When the degradation of a MIMO antenna array occurs due to increased radiation correlation pattern between antenna elements, the decreased throughput and increased latency can occur in both the downlink and uplink directions. As noted above, in a degraded state the communication device of the electronic device and the associated components operating the MIMO antenna array can begin to draw increased current, which leads to decreased run time and a diminished overall user experience. The increased current drain results from the communication device and associated components struggling to operate antenna elements that are actually inefficient due to increased radiation correlation patterns.

Embodiments of the disclosure provide a solution to these and other situations by providing dynamic MIMO antenna array performance optimization methods and systems that adjust the number of antenna elements being used in a MIMO antenna array as a function of radiation correlation patterns between antenna elements, and in particular changes in radiation correlation patterns between antenna elements that may occur in response to a triggering event such as the device changing its physical geometry, being placed on a table, or being placed in a purse.

In one or more embodiments, an electronic device includes a MIMO antenna array comprising a plurality of antenna elements configured for MIMO communication across a network. In one or more embodiments, the electronic device also includes one or more sensors detecting a triggering event altering a radiation correlation pattern between at least two antenna elements of the plurality of antenna elements. In one or more embodiments, the electronic device includes one or more processors that select, in response to the one or more sensors detecting the triggering event, a quantity of antenna elements from the plurality of antenna elements to be available for engagement in the MIMO communication across the network as a function of the radiation correlation pattern.

Illustrating by example, the one or more processors may determine a correlation score for each antenna element of the plurality of antenna elements in response to the triggering event. This can be done both in an uplink direction and a downlink direction. Antenna elements can be excluded from engaging in the MIMO communication when the correlation score for the antenna element is above a first predefined correlation score threshold. By contrast, when the correlation score falls below a second predefined correlation score threshold, an antenna element can be included in engaging in the MIMO communication across the network, and so forth.

Advantageously, embodiments of the disclosure provide an electronic device with one or more processors that dynamically monitor the MIMO performance of each antenna element in each direction based upon certain triggered events that are known to significantly impact antenna correlations, one example of which is a form factor change. In one or more embodiments, the one or more processors then assign or update correlation scores for each antenna element of the MIMO antenna array in response to the triggering event occurring.

In one or more embodiments, the one or more processors then make a decision regarding whether a particular antenna element is suitable for MIMO performance based on its correlation status relative to other antenna elements. When the correlation score indicates that another antenna element would be better, it gets used. Similarly, if an antenna element currently in use for MIMO communication across the network is suboptimal based upon the correlation score, it can be removed from usage.

This dynamic evaluation of each antenna element in the MIMO antenna array continues in both uplink and downlink directions, with the one or more processors of the electronic device dynamically maintaining a list of which antenna element are being used for MIMO communication and which ones are precluded from MIMO communication due to high correlation scores with another antenna element. The list maintained by the one or more processors may be mutually exclusive, meaning the antenna elements used for MIMO communication may, or may not, be used for spatial diversity as well and vice-versa.

In one or more embodiments, depending upon the type of triggering event, the one or more processors may assign a predetermined correlation score, may calculate a correlation score, may infer a correlation score, or combinations thereof, for each antenna element of the MIMO antenna array. Moreover, the dynamic enhancement methods and systems described below may be extended to apply to technologies other than MIMO antenna array and MIMO communication, one example of which is evolved-universal terrestrial radio access new radio dual connectivity or "ENDC."

In one or more embodiments, a method in an electronic device comprises detecting, with one or more sensors, a triggering event altering a radiation correlation pattern between at least two antenna elements of a plurality of antenna elements defining a MIMO antenna array. The method then includes increasing, using one or more processors in response to the one or more sensors detecting the triggering event, a quantity of antenna elements selected from the plurality of antenna elements for use in MIMO communication across a network when the triggering event decreases radiation correlation patterns between at least two antenna elements of the plurality of antenna elements and decreasing, again using the one or more processors in response to the one or more sensors detecting the triggering event, the quantity of antenna elements for use in the MIMO communication across the network when the triggering event increases the radiation correlation patterns between the at least two antenna elements of the plurality of antenna elements.

Embodiments of the disclosure advantageously provide techniques for intelligently adapting antenna element use for MIMO communication versus spatial diversity as a function of dynamically evaluating correlations of antenna element of a MIMO antenna array in response to certain triggering events known to impact such correlations. Depending upon the triggering event, correlation scores between antenna element may be predetermined, inferred, measured, or combinations hereof. When an antenna element has a high correlation with another antenna element, it may be precluded from engaging in MIMO communication. At the same time, it may still be available for spatial diversity age. Accordingly, in one or more embodiments there is mutual exclusivity between MIMO and spatial diversity usage.

Embodiments of the disclosure are particularly beneficial for deformable electronic devices such as those having a bendable device housing, or a first device housing joined to a second device housing by a hinge such that the first device housing is pivotable about the hinge relative to the second device housing between an axially displaced open position and a closed position. Since such devices may have two antenna elements in the first device housing and two antenna elements in the second device housing, when the electronic device is in the axially displaced open position there is generally half-wavelength separation between antenna elements so that all four antenna elements can be used for MIMO communication. However, when the first device housing pivots about the hinge relative to the second device housing from the axially displaced open position to the closed position, the one or more processors can determine whether correlations between now abutting antenna element regions increase to the point where usage of some antenna elements becomes inefficient. When this occurs, those antenna elements can be removed from engaging in MIMO communication. While a hinged electronic device is one example of an electronic device to which embodiments of the disclosure are particularly well suited, others will be described below and include bendable electronic devices, sliding electronic devices, and other types of electronic devices where a physical form factor changes.

Thus, in one or more embodiments an electronic device comprises a first device housing pivotable about a hinge relative to a second device housing between an axially displaced open position and a closed position. The electronic device includes a MIMO antenna array comprising a plurality of antenna elements configured for MIMO communication across a network. The electronic device also includes one or more processors. In one or more embodiments, the one or more processors increase a quantity of antenna elements available to engage in the MIMO communication when the electronic device is in the axially displaced open position but decrease the quantity of antenna elements available to engage in the MIMO communication when the electronic device is in the closed position.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge assembly 101 couples the first device housing 102 to the second device housing 103. In one or more embodiments, the first device housing 102 is selectively pivotable about the hinge assembly 101 relative to the second device housing 103. For example, in one or more embodiments the first device housing 102 is selectively pivotable about the hinge assembly 101 between a closed position, shown and described below with reference to FIG. 4, and an axially displaced open position, which is shown in FIG. 1. In other embodiments the electronic device 100 will include no hinge assembly 101, and instead will include a single device housing that defines the first device housing 102 and the second device housing 103 as a singular, continuous unit without any hinge.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge assembly. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 141. This allows the display 105 to be flexible so as to deform when the first device housing 102 pivots about the hinge assembly 101 relative to the second device housing 103. In one or more embodiments, the OLED display is constructed on flexible plastic substrates can allow the flexible display 141 to bend with various bending radii.

In one or more embodiments the flexible display 141 may be formed from multiple layers of flexible material such as flexible sheets of polymer or other materials. In this illustrative embodiment, the flexible display 141 is fixedly coupled to the first device housing 102 and the second device housing 103. The flexible display 141 spans the hinge assembly 101 in this illustrative embodiment.

Features can be incorporated into the first device housing 102 and/or the second device housing 103. Examples of such features include a imager 106 or an optional speaker port 107, which are shown disposed on the rear side of the electronic device 100 in this embodiment but could be placed on the front side as well.

In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted. Other features can be added and can be located on the front of one or both of the first device housing 102 and/or the second device housing 103, sides of one or both of the first device housing 102 and/or the second device housing 103, or in other locations as well.

A block diagram schematic 104 of the electronic device 100 is also shown in FIG. 1. The block diagram schematic 104 can be configured as a printed circuit board assembly disposed within either or both of the first device housing 102 or the second device housing 103 of the electronic device 100. Various components can be electrically coupled together by conductors or a bus disposed along one or more printed circuit boards. For example, some components of the block diagram schematic 104 can be configured as a first electronic circuit fixedly situated within the first device housing 102, while other components of the block diagram schematic 104 can be configured as a second electronic circuit fixedly situated within the second device housing 103. A flexible substrate can then span the hinge assembly 101 to electrically couple the first electronic circuit to the second electronic circuit.

It should be noted that the block diagram schematic 104 includes many components that are optional, but which are included in an effort to demonstrate how varied electronic devices configured in accordance with embodiments of the disclosure can be. Thus, it is to be understood that the block diagram schematic 104 of FIG. 1 is provided for illustrative purposes only and for illustrating components of one electronic device 100 in accordance with embodiments of the disclosure. The block diagram schematic 104 of FIG. 1 is not intended to be a complete schematic diagram of the various components required for an electronic device 100. Therefore, other electronic devices in accordance with embodiments of the disclosure may include various other components not shown in FIG. 1 or may include a combination of two or more components or a division of a particular component into two or more separate components, and still be within the scope of the present disclosure.

In one or more embodiments, the electronic device 100 includes one or more processors 109. The one or more processors 109 can be a microprocessor, a group of processing components, one or more Application Specific Integrated Circuits (ASICs), programmable logic, or other type of processing device. The one or more processors 109 can be operable with the various components of the electronic device 100. The one or more processors 109 can be configured to process and execute executable software code to perform the various functions of the electronic device 100. A storage device, such as memory 130, can optionally store the executable software code used by the one or more processors 109 during operation.

In one or more embodiments, the one or more processors 109 are further responsible for performing the primary functions of the electronic device 100. For example, in one embodiment the one or more processors 109 comprise one or more circuits operable to present presentation information, such as images, text, and video, on the flexible display 141. The executable software code used by the one or more processors 109 can be configured as one or more modules 113 that are operable with the one or more processors 109. Such modules 113 can store instructions, control algorithms, and so forth.

In one embodiment, the one or more processors 109 are responsible for running the operating system environment 114. The operating system environment 114 can include a kernel, one or more drivers 115, and an application service layer 116, and an application layer 117. The operating system environment 114 can be configured as executable code operating on one or more processors or control circuits of the electronic device 100.

In one or more embodiments, the one or more processors 109 are responsible for managing the applications of the electronic device 100. In one or more embodiments, the one or more processors 109 are also responsible for launching, monitoring and killing the various applications and the various application service modules. The applications of the application layer 117 can be configured as clients of the application service layer 116 to communicate with services through application program interfaces (APIs), messages, events, or other inter-process communication interfaces.

In this illustrative embodiment, the electronic device 100 also includes a communication circuit 118 that can be configured for wired or wireless communication with one or more other devices or networks. The networks can include a wide area network, a local area network, and/or personal area network. The communication circuit 118 may also utilize wireless technology for communication, such as, but are not limited to, peer-to-peer or ad hoc communications, and other forms of wireless communication such as infrared technology. The communication circuit 118 can include wireless communication circuitry, one of a receiver, a transmitter, or transceiver, and one or more antennas 119.

In the illustrative embodiment of FIG. 1, the one or more antennas 119 comprise a MIMO antenna array 120 comprising a plurality of antenna elements 121,122,123,124 configured for MIMO communication 125 with other remote electronic devices, servers, base stations, and so forth, across a network 126. In the illustrative embodiment of FIG. 1, the MIMO antenna array 120 consists of four antenna elements 121,122,123,124, with a first antenna element 121 being positioned in an upper righthand corner (as viewed in FIG. 1) of the first device housing 102 and a second antenna element 122 being positioned in a left-hand corner of the first device housing 102. A third antenna element 123 is positioned at the lower righthand corner of the second device housing 103, while a fourth antenna element 124 is positioned at the lower left-hand corner of the second device housing 103.

While four antenna elements 121,122,123,124 are shown as defining the MIMO antenna array 120 in FIG. 1, it should be noted that embodiments of the disclosure, and in particular dynamic MIMO antenna array optimization techniques, are not limited to only MIMO antenna arrays having four antenna elements. While MIMO antenna arrays including four antenna elements are commonly utilized in electronic devices such as smartphones today, embodiments of the disclosure contemplate that soon electronic devices will be equipped with six antenna element, eight antenna element, or higher numbers of antenna element defining MIMO antenna arrays in the future. Accordingly, while a four-antenna element MIMO antenna array is used illustratively to explain how dynamic optimization of such a MIMO antenna array can work, it will be obvious to those of ordinary skill in the art having the benefit of this disclosure that these dynamic optimization techniques can equally be applied—and likely to produce even more benefits—in MIMO systems having more than six antenna elements.

The effectiveness of each antenna element 121,122,123, 124 to engage in MIMO communication 125 across the network 126 is determined by a number of factors, with the primary two being correlation and polarity. MIMO antenna arrays work by transmitting and receiving multiple data streams at the same time. Hence the name, "multiple input, multiple output" antenna array. For this to occur, the MIMO antenna array 120 must be comprised of a plurality of antenna elements.

For the "MIMO" communication to occur, each antenna element 121,122,123,124 should be at least somewhat electromagnetically "independent" from the other antenna elements. One certain way to do this is to ensure that each antenna element 121,122,123,124 is physically separated from the other antenna elements by a distance equal or greater than a half wavelength of a frequency of interest, which in this application is a frequency of a MIMO communication signal 127 of the MIMO communication 125. When this occurs, two antenna elements, e.g., antenna element 121 and antenna element 123, are considered to have good "isolation" and therefore not be "correlated." Said differently, the correlation of the radiation patterns between the two antenna elements 121,123 is low. It is for this reason that designers often position antenna elements of a MIMO antenna array at opposite physical end of and electronic device.

Figure 4:
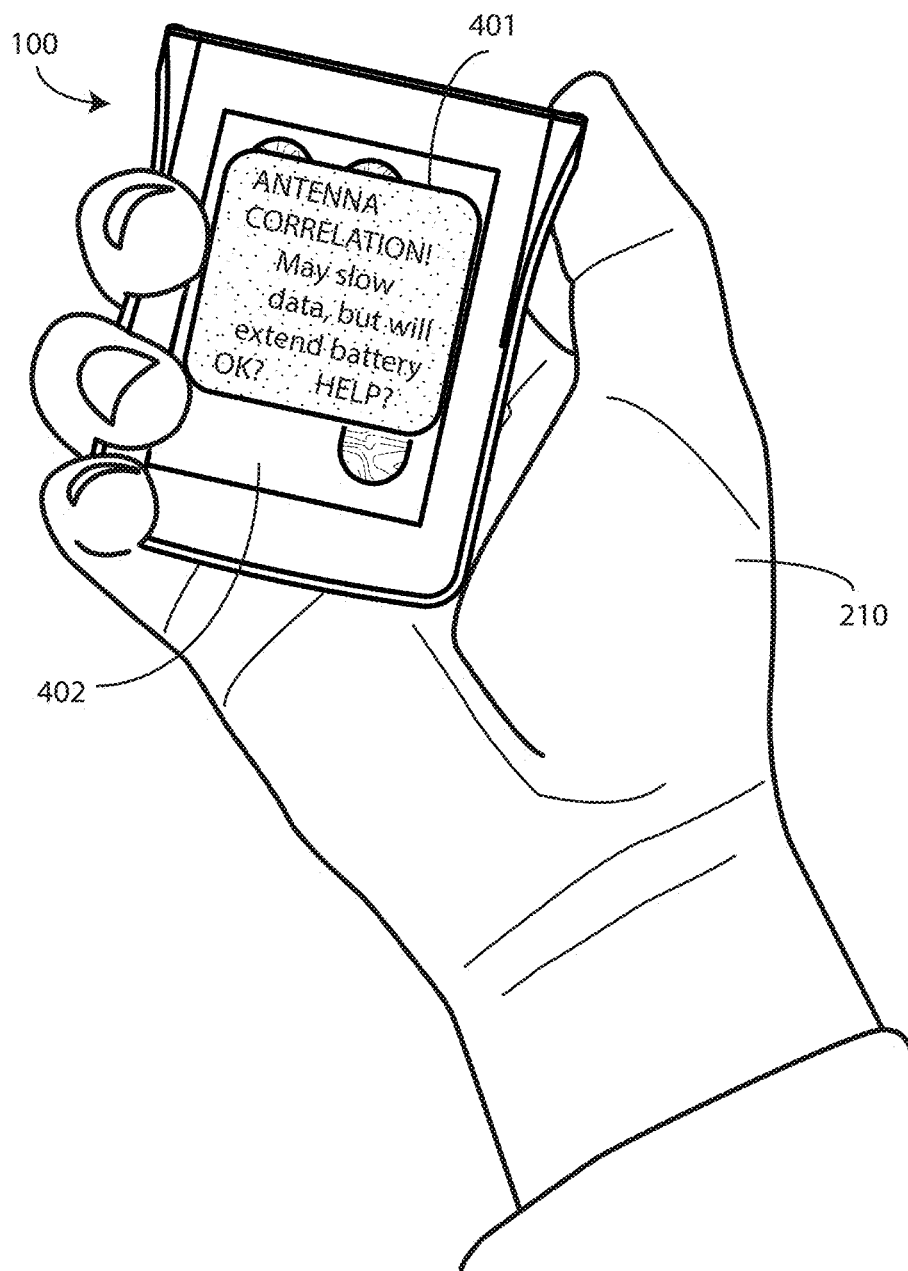
FIG. 4 illustrates one explanatory electronic device presenting a prompt in accordance with one or more embodiments of the disclosure.

However, in the example of FIG. 1, when the first device housing 102 pivots about the hinge assembly 101 relative to the second device housing 103 from the axially displaced open position of FIG. 1 to the closed position of FIG. 4, this half-wavelength separation no longer occurs. This is due to the fact that, for example, the portion of the first device housing 102 housing antenna element 121 abuts the portion of the second device housing 103 housing antenna element 123. Collapsing the physical distance between antenna element 121 and antenna element 123 from what was a half-wavelength or greater distance to one that is much smaller can cause the antenna elements 121,123 to become highly correlated. Said differently, the correlation of the radiation patterns between the two antenna elements 121,123 becomes high. Accordingly, this pivoting of the first device housing 102 about the hinge assembly 101 relative to the second device housing 103 is known as a "triggering event" in that when it occurs, the correlation between any two antenna elements 121,122,123,124 of the MIMO antenna array 120 can change.

Figure 6:
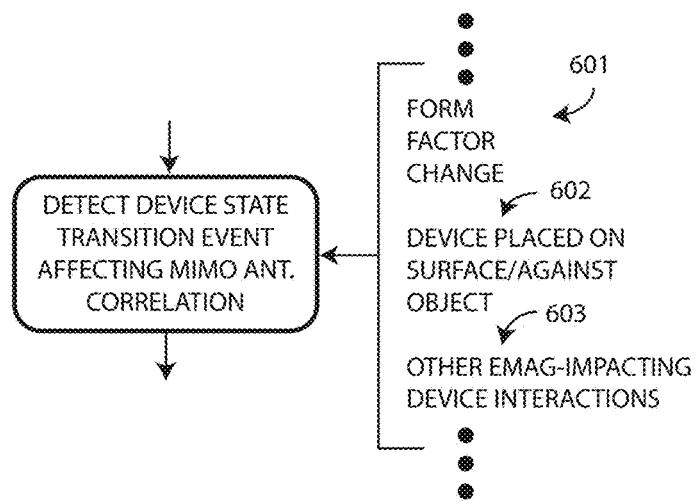
FIG. 6 illustrates one or more explanatory triggering events altering a radiation correlation pattern in accordance with one or more embodiments of the disclosure.

Triggering events can take a variety of forms. Turning briefly to FIG. 6, illustrated therein are a few examples. A first example of a triggering event 601 is a change in form factor experienced by an electronic device. Using the electronic device (100) of FIG. 1, this triggering event 601 can occur any time the first device housing (102) pivots about the hinge assembly (101) relative to the second device housing (103) between an axially displaced open position and a closed position. This triggering event 601 can occur in other ways as well. Illustrating by example, as will be described below with reference to FIGS. 10-11, in situations where an electronic device includes a single device housing that is deformable, this triggering event 601 can occur when a portion of a device housing deforms, thereby changing the spatial relationship between a first device housing portion and a second device housing portion. As will be described below with reference to FIGS. 12-13, this triggering event 601 can also occur in a sliding electronic device when a first device housing slides relative to a second device housing. Other examples of a triggering event 601 changing a form factor of an electronic device will be obvious to those of ordinary skill in the art having the benefit of this disclosure.

A second example of a triggering event 602 is the placement of an electronic device against a surface or other object. Illustrating by example, as will be described below with reference to FIG. 8, placement of an electronic device on a metal table or other surface can greatly change the correlation between antenna elements of a MIMO antenna array. Similarly, as will be described below with reference to FIG. 9, placement of an electronic device in a pocket or purse where the electronic device is adjacent to keys and other metal objects can change the correlations between antenna elements as well.

Triggering events can take other forms as well, with the third example of a triggering event 603 including miscellaneous actions that can alter the correlation between one or more embodiments antenna elements of a MIMO antenna array. Illustrating by example, placing an electronic device inside a drawer or in a cabinet might constitute one such triggering event 603. Similarly, placing an electronic device near magnets or other electromagnetic elements may constitute such a triggering event 603. Other examples of such miscellaneous triggering events 603 will be obvious to those of ordinary skill in the art having the benefit of this disclosure.

Turning now back to FIG. 1, in one or more embodiments when such a triggering event occurs, a MIMO antenna correlation manager 128 selects a quantity of antenna elements from the plurality of antenna elements 121,122,123, 124 available for use in MIMO communication activities to engage in the MIMO communication 125 across the network 126. In one or more embodiments, the MIMO antenna correlation manager 128 does this as a function of a radiation correlation pattern that indicates an amount of correlation between two or more antenna element of the MIMO antenna array 120.

The MIMO antenna correlation manager 128 can be configured as a hardware module operable with the one or more processors 109 in one or more embodiments. In other embodiments, the MIMO antenna correlation manager 128 is configured as software or firmware operating on the one or more processors 109. In still other embodiments, the MIMO antenna correlation manager 128 is configured as a hardware component integrated within the one or more processors 109. Other configurations for the MIMO antenna correlation manager 128 will be obvious to those of ordinary skill in the art having the benefit of this disclosure.

In one or more embodiments, the MIMO antenna correlation manager 128 determines a correlation score for each antenna element 121,122,123,124 of the MIMO antenna array 120 in response to one or more sensors 129 detecting a triggering event, one example of which occurs when the first device housing 102 pivots about the hinge assembly 101 relative to the second device housing between an axially displaced open position to a closed position, or to positions therebetween. In one or more embodiments, the correlation score, when low, indicates that compared antenna element of the MIMO antenna array 120 have radiation patterns that are different and uncorrelated, thereby indicating that a particular antenna element has good "isolation" relative to another antenna element. By contrast, when the correlation score is high between compared antenna elements, this means that their radiation patterns are highly correlated and may even being effectively the same. When this occurs, MIMO functionality decreases or is unavailable.

The determination of a correlation score can occur in a number of different ways. Effectively, the correlation score is a metric indicating whether radiation patterns of two antenna element are highly correlated. Illustrating by example, the correlation score can include a determination of an envelope correlation coefficient indicating the lack of a radiation correlation pattern between two compared antenna elements. If, for example, one antenna element is horizontally polarized and another antenna element is vertically polarized, their correlation score would be small or zero due to the fact that the radiation correlation pattern between the two elements is small or zero. Alternatively, if one antenna element has a radiation pattern directed in one direction, with another antenna element having a radiation pattern directed in the opposite direction, the correlation score would also be zero due to no radiation correlation pattern between the compared antenna elements.

In one or more embodiments, the correlation score is mathematically computed, inferred, or even assigned as a function of form factor, for example, in response to the one or more sensors 129 detecting a triggering event. Where calculated, the correlation score can be defined mathematically using spherical coordinates in a vector function. This function can indicate elevation, azimuth, and tilt of a radiation pattern for each antenna element. This function can also indicate polarization of the electric field of the radiation pattern of each antenna element. Each function can vary across its shape and can have an associated polarization therewith. Two functions can be compared mathematically to determine how correlated radiation patterns are, or, whether there is a significant radiation correlation pattern between compared antenna element. The closer the correlation score gets to 1.0 the more correlated two antenna elements are, while lesser correlated antenna elements have scores closers to 0.0. Perfectly correlated antenna elements have a correlation score of 1.0, while perfectly uncorrelated antenna elements have a correlation score of 0.0.

While mathematical computation is one way to determine the correlation score, in other embodiments the MIMO antenna correlation manager 128 either infers the correlation score or assigns it based upon other inputs. Illustrating by example, experimental testing in the lab may provide a table of expected correlation scores as a function of device geometry or device environment that can be stored in a memory 130 of the electronic device 100. If the electronic device 100 is in the axially displaced open position, this corresponds to one correlation score between antenna elements, while a closed position corresponds to another correlation score between antenna elements. Similarly, when the electronic device 100 is situated in free space one correlation score between antenna elements may be expected, while another correlation score is expected when the electronic device 100 is situated on a metal table.

The MIMO antenna correlation manager 128 may infer the correlation score as well. Illustrating by example, if a correlation score is known between antenna elements when the electronic device 100 is in the axially displaced open position, and another when the electronic device 100 is in the closed position, the MIMO antenna correlation manager 128 may infer values therebetween as the electronic device transitions between the axially displaced open position and the closed position, and so forth. In one or more embodiments, the MIMO antenna correlation manager 128 determines the correlation score for each antenna element 121, 122,123,124 in both an uplink direction and a downlink direction.

Polarization of each antenna element 121,122,123,124 can be important as well in determining the correlation score. Illustrating by example, if there is more than one half wavelength of physical separation between antenna elements, this constitutes "natural separation" between those antenna elements. Accordingly, the antenna elements are considered "isolated" and "uncorrelated" even if the polarization is similar. Thus, even if the polarization is similar, both antenna element may be useful in MIMO communication.

By contrast, when there is less than one half wavelength of physical separation between antenna element, one may ordinarily think of these antenna elements having a significant radiation correlation pattern. However, if the polarity is sufficiently different, the antenna element may still be sufficiently isolated and uncorrelated so as to be useful in MIMO communication.

Thus, in one or more embodiments the MIMO antenna correlation manager 128 selects a quantity of antenna element from the available antenna elements 121,122,123,124 for engagement in the MIMO communication 125 across the network 126. For instance, in one or more embodiments the MIMO antenna correlation manager 128 excludes an antenna element in the quantity of antenna elements engaged in the MIMO communication 125 across the network 126 when the correlation score for the antenna element is above a first predefined correlation score threshold. By contrast, the MIMO antenna correlation manager 128 may include an antenna element in the quantity of antenna elements engaged in the MIMO communication 125 across the network 126 when the correlation score falls below a predefined correlation score threshold.

Illustrating by example, presume that initially the network 126 assigns the electronic device a rank indicator of four, which means that the network architecture expects the communication circuit 118 of the electronic device 100 to communicate with all four antenna elements 121,122,123, 124 due to the fact that the electronic device 100 is in the axially displaced open position of FIG. 1, thereby providing adequate isolation between antenna elements. Now consider the situation that occurs when the first device housing 102 pivots about the hinge assembly 101 relative to the second device housing 103 to the closed position. This may cause, for example, the correlation score between antenna element 121 and antenna element 123 to increase above a predefined correlation score threshold. Accordingly, the MIMO antenna correlation manager 128 may exclude antenna element 121 from engaging in the MIMO communication 125 across the network 126. Similarly, if the triggering event transitioning the electronic device 100 from the axially displaced open position to the closed position causes the correlation score between antenna element 122 and antenna element 124 to increase above a predefined correlation score threshold, the MIMO antenna correlation manager 128 may preclude antenna element 124 from engaging in the MIMO communication 125 across the network 126.

If, however, the MIMO antenna correlation manager 128 is thereafter able to sufficiently alter the polarization of antenna element 124 or otherwise retune the antenna element 124 by continually measuring its impedance and/or isolation relative to other antenna elements such that the correlation score between antenna element 121 and antenna element 124 falls below another predefined correlation score threshold, the MIMO antenna correlation manager 128 may again include antenna element 124 in the quantity of antenna elements engaged in the MIMO communication 125 across the network 126. Illustrating by example, the MIMO antenna correlation manager 128 may continue to measure the isolation between, or among, a set of antenna elements and/or measure the impedance of the antenna elements to use such measurements for tuning purposes to tune one or more antenna elements to alter the isolation. When this is done, the correlation score between antenna element 121 and antenna element 124 may fall below the other predefined correlation score threshold, thereby allowing MIMO antenna correlation manager 128 to again include, for example, antenna element 124 in the quantity of antenna elements engaged in the MIMO communication 125 across the network 126.

The first predefined correlation score threshold above which one or more antenna elements get excluded from engaging in the MIMO communication 125 across the network 126, and the second predefined correlation score threshold below which one or more antenna elements are included in engaging in the MIMO communication 125 across the network 126 can be the same or different. Illustrating by example, in one or more embodiments two antenna elements are uncorrelated if separated by a half wavelength or more and are included in engaging in the MIMO communication 125 across the network 126. Otherwise, they are not. Hence, the first predefined correlation score threshold above which one or more antenna elements get excluded from engaging in the MIMO communication 125 across the network 126, and the second predefined correlation score threshold below which one or more antenna elements are included in engaging in the MIMO communication 125 across the network 126 would be the same.

However, when the correlation score takes into account other factors such as direction of radiation pattern and/or polarization in addition to physical separation, the first predefined correlation score threshold above which one or more antenna elements get excluded from engaging in the MIMO communication 125 across the network 126, and the second predefined correlation score threshold below which one or more antenna elements are included in engaging in the MIMO communication 125 across the network 126 can be different. An antenna element may be included in engaging in the MIMO communication 125 across the network 126 when the predefined correlation score threshold is below, say, 0.3 with another antenna element, while the same antenna element may be precluded from engaging in the MIMO communication 125 across the network 126 when the predefined correlation score threshold is above, say, 0.7 relative to another antenna element. These examples of predefined correlation score thresholds are illustrative only, as numerous others will be obvious to those of ordinary skill in the art having the benefit of this disclosure.

In one or more embodiments, the MIMO antenna correlation manager 128 includes an antenna element in the quantity of antenna elements when the correlation score for the antenna element is at least one-half wavelength of a MIMO communication signal 127 of the MIMO communication 125 different from other correlation scores of other antenna elements included with the quantity of antenna elements. These various correlation scores can be used to create a map 131 of antenna element available to engage in the MIMO communication 125 stored in the memory 130 of the electronic device 100. One example of such a map 131 is shown in FIG. 7.

Figure 5:
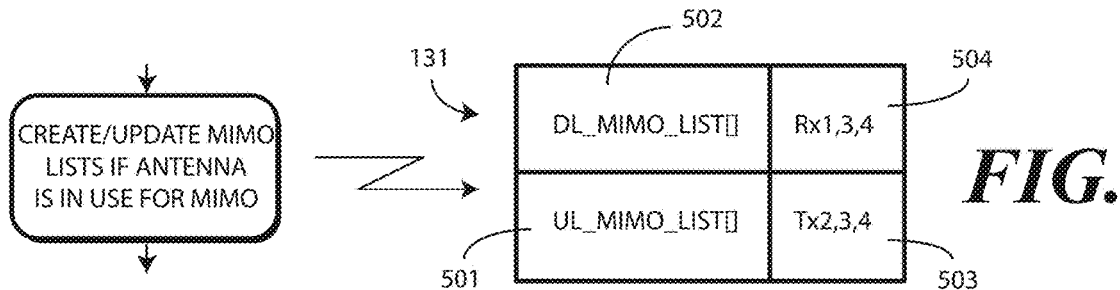
FIG. 5 illustrates one explanatory map of antenna elements in accordance with one or more embodiments of the disclosure.
Figure 7:
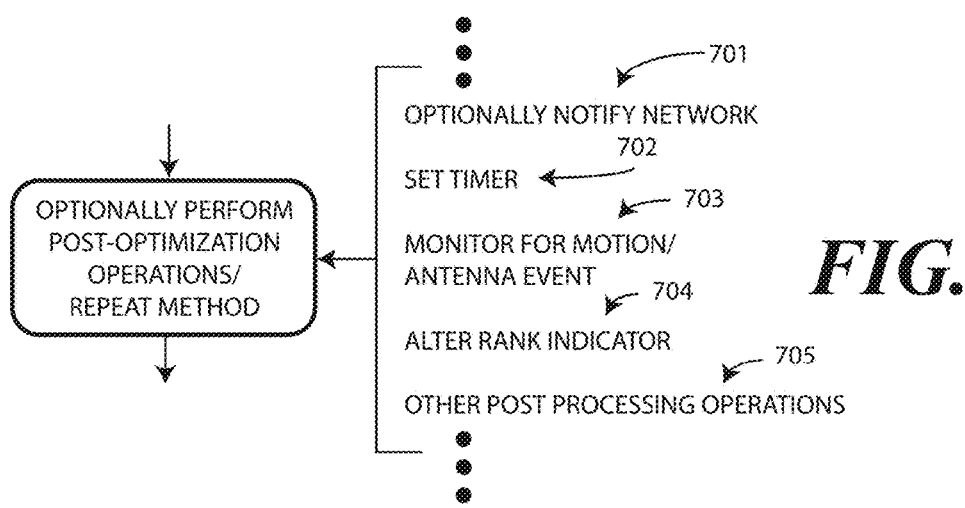
FIG. 7 illustrates one or more explanatory method steps in accordance with one or more embodiments of the disclosure.

Turning briefly to FIG. 7, the map 131 lists a number of antenna element engaging in MIMO communication (125) across a network (126). In one or more embodiments, the map 131 lists such a number in both the uplink direction 501 and in the downlink direction 502. In the illustrative embodiment of FIG. 5, the map 131 includes a MIMO antenna list 503 for the uplink direction indicating that antenna elements (122,123,124) are engaged in the MIMO communication (125) across the network (126) in the uplink direction 501. The map also includes another MIMO antenna list 504 indicating that antenna elements (121,123,124) are engaged in the MIMO communication (125) across the network (126) in the downlink direction 502.

In one or more embodiments, the MIMO antenna correlation manager (128) continually and dynamically update the map 131 in response to one or more sensors (129) of the electronic device (100) detecting triggering events. Accordingly, the MIMO antenna correlation manager (128) may update the map 131 when selecting the quantity of antenna elements available for engagement in the MIMO communication (125) across the network (126) by replacing a first antenna element in the quantity of antenna elements with a second antenna element having a lower correlation with other antenna elements included in the quantity of antenna elements, and so forth. Thus, in one or more embodiments the MIMO antenna correlation manager (128) updates, in the memory (130) of the electronic device (100), the map 131 of antenna elements available for engagement in the MIMO communication (125).

Turning now back to FIG. 1, the MIMO antenna correlation manager 128 may also maintain a table 132 of correlation scores for each antenna element 121,122,123, 124 of the MIMO antenna array 120 relative to each other antenna element 121,122,123,124 as well. In one or more embodiments, the MIMO antenna correlation manager 128 dynamically maintains this table 132 of correlation scores by updating each correlation score in response to the one or more sensors 129 detecting a triggering event.

As noted above, one or more sensors 129 can be included to detect triggering events affecting the radiation correlation patterns between antenna element 121,122,123,124 of the MIMO antenna array 120. In one or more embodiments, the one or more sensors 129 include one or more form factor sensors 133 configured to detect changes in a physical form factor of the electronic device 100.

Illustrating by example, in one embodiment, the one or more form factor sensors 133 comprise one or more flex sensors 134, operable with the one or more processors 109, to detect a bending operation that causes the first device housing 102 to pivot about the hinge assembly 101 relative to the second device housing 103, thereby transforming the electronic device 100 into a deformed geometry. In one or more embodiments, the one or more flex sensors 134 can detect initiation of the first device housing 102 pivoting, bending, or deforming about the hinge assembly 101 relative to the second device housing 103. The one or more flex sensors 134, where included, can take various forms.

In one or more embodiments, one or more flex sensors 134 comprise passive resistive devices manufactured from a material with an impedance that changes when the material is bent, deformed, or flexed. By detecting changes in the impedance as a function of resistance, the one or more processors 109 can use the one or more flex sensors to detect bending or flexing. In one or more embodiments, each flex sensor comprises a bi-directional flex sensor that can detect flexing or bending in two directions. In one embodiment, the one or more flex sensors 134 have an impedance that increases in an amount that is proportional with the amount it is deformed or bent.

In one embodiment, each flex sensor is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor bends, the impedance of the resistive layer changes, thereby altering the flow of current for a given voltage. The one or more processors 109 can detect this change to determine that bending is occurring. Taps can be added along each flex sensor to determine other information, including the number of folds, the degree of each fold, the location of the folds, the direction of the folds, and so forth. The flex sensor can further be driven by time-varying signals to increase the amount of information obtained from the flex sensor as well.

While a multi-layered device as a flex sensor is one configuration suitable for detecting a bending operation occurring to deform the electronic device 100, the one or more form factor sensors 133 can include other devices as well. For instance, a magnet can be placed in the first device housing 102 while a magnetic sensor is placed in the second device housing 103, or vice versa. The magnetic sensor could be Hall-effect sensor, a giant magnetoresistance effect sensor, a tunnel magnetoresistance effect sensor, an anisotropic magnetoresistive sensor, or other type of sensor.

In still other embodiments, the one or more form factor sensors 133 can comprise an inductive coil placed in the first device housing 102 and a piece of metal placed in the second device housing 103, or vice versa. When the metal gets closer to, or farther from, the coil, the one or more form factor sensors 133 detect that a bending operation is occurring.

In other embodiments the one or more form factor sensors 133 can comprise an inertial motion unit situated in the first device housing 102 and another inertial motion unit situated in the second device housing 103. The one or more processors 109 can compare motion sensor readings from each inertial motion unit to detect movement of the first device housing 102 relative to the second device housing 103, as well as the orientation of the first device housing 102 and the second device housing 103 relative to the direction of gravity. This data can be used to detect a triggering event in the form of a bending operation occurring between the first device housing 102 and the second device housing 103.

Where included in the one or more form factor sensors 133, each inertial motion unit can comprise a combination of one or more accelerometers, one or more gyroscopes, and optionally one or more magnetometers, to determine the orientation, angular velocity, and/or specific force of one or both of the first device housing 102 or the second device housing 103. When included in the electronic device 100, these inertial motion units can be used as orientation sensors to measure movement of one or both of the first device housing 102 or the second device housing 103 in three-dimensional space. Similarly, the inertial motion units can be used as orientation sensors to measure the motion of one or both of the first device housing 102 or second device housing 103 in three-dimensional space. The inertial motion units can be used to make other measurements as well.

Where only one inertial motion unit is included in the first device housing 102, this inertial motion unit is configured to determine an orientation, which can include measurements of azimuth, plumb, tilt, velocity, angular velocity, acceleration, and angular acceleration, of the first device housing 102. Similarly, where two inertial motion units are included, with one inertial motion unit being situated in the first device housing 102 and another inertial motion unit being situated in the second device housing 103, each inertial motion unit determines motion of its respective device housing is occurring. Inertial motion unit can determine measurements of azimuth, plumb, tilt, velocity, angular velocity, acceleration, angular acceleration, and so forth of the first device housing 102, while inertial motion unit can determine measurements of azimuth, plumb, tilt, velocity, angular velocity, acceleration, angular acceleration, and so forth of the second device housing 103, and so forth.

In one or more embodiments, each inertial motion unit delivers these orientation measurements to the one or more processors 109 in the form of orientation determination signals. Thus, the inertial motion unit situated in the first device housing 102 outputs a first orientation determination signal comprising the determined orientation of the first device housing 102, while the inertial motion unit situated in the second device housing 103 outputs another orientation determination signal comprising the determined orientation of the second device housing 103.

In one or more embodiments, the orientation determination signals are delivered to the one or more processors 109, which report the determined orientations to the various modules, components, and applications operating on the electronic device 100, one example of which is the MIMO antenna correlation manager 128. In one or more embodiments, the one or more processors 109 can be configured to deliver a composite orientation that is an average or other combination of the orientation of orientation determination signals indicative of a triggering event to the MIMO antenna correlation manager 128. In other embodiments, the one or more processors 109 are configured to deliver one or the other orientation determination signal to the MIMO antenna correlation manager 128, and so forth.

Still other sensors 129 operable to detect triggering events can comprise proximity sensors that detect movement of a first end of the electronic device 100 relative to a second end of the electronic device 100. Other examples of the sensors 129 operable to detect triggering events will be obvious to those of ordinary skill in the art having the benefit of this disclosure.

In one or more embodiments, the imager 106 can be used to identify triggering events. Recall from the discussion of FIG. 6 above that another triggering event is placement of the electronic device 100 on a metal table or other surface. The imager 106 can capture images of the table or surface approaching the exterior surfaces of the electronic device 100 to identify such a triggering event.

In one or more embodiments, when the one or more sensors 129 detect a triggering event altering a radiation correlation pattern between at least two antenna elements of the plurality of antenna elements defining the MIMO antenna array 120, the MIMO antenna correlation manager 128 selects a quantity of antenna element from the plurality of antenna element for engagement in the MIMO communication 125 across the network 126. The MIMO antenna correlation manager 128 may increase, using the one or more processors 109 in response to the one or more sensors 129 detecting the triggering event, a quantity of antenna elements selected from the plurality of antenna elements for use in the MIMO communication 125 across the network 126 when the triggering event decreases radiation correlation patterns between at least two antenna elements of the plurality of antenna elements. Alternatively, the MIMO antenna correlation manager 128 may decrease, using the one or more processors 109 in response to the one or more sensors 129 detecting the triggering event, the quantity of antenna elements for use in the MIMO communication 125 across the network 126 when the triggering event increases the radiation correlation patterns between the at least two antenna elements of the plurality of antenna elements.

In one or more embodiments, the increasing occurs when the triggering event decreases the radiation correlation pattern between the at least two antenna elements of the plurality of antenna elements by at least a half wavelength of a MIMO communication signal 127 used for the MIMO communication 125 across the network 126. In one or more embodiments, the MIMO antenna correlation manager 128 further determines a polarization of the at least two antenna elements and increases the quantity of antenna element engaged in the MIMO communication 125 across the network 126 when the triggering event decreases the radiation correlation pattern between the at least two antenna elements, but only when a first polarization of a first antenna element is rotated relative to a second polarization of a second antenna element by at least a predefined rotation threshold such as ninety degrees.

In one or more embodiments, the imager 106 is configured as an intelligent imager. Where configured as an intelligent imager, the imager 106 can capture one or more images of environments about the electronic device 100 to determine whether the object matches predetermined criteria. For example, the imager 106 can operate as an identification module configured with optical recognition such as image recognition, character recognition, visual recognition, facial recognition, color recognition, shape recognition and the like. Advantageously, the imager 106 can use these processes to identify triggering events, whether they are changes in form factor of the electronic device 100, the electronic device 100 being placed on a surface, in a pocket, in a purse, or in another environment.

In one or more embodiments, the MIMO antenna correlation manager 128 is configured to generate estimates, with one or more processors 109, of an amount of correlation between antenna elements 121,122,123,124 of the MIMO antenna array 120 by comparing least one image captured by the imager 106 to at least one other image to determine how one or more conditions of the electronic device 100 have changed. In one or more embodiments, the MIMO antenna correlation manager 128 determines a radiation correlation pattern between antenna elements when, for example, the first device housing 102 and the second device housing 103 pivot about the hinge assembly 101 between the axially displaced open position and the closed position. From this information, the MIMO antenna correlation manager 128 can select a quantity of antenna elements for engagement in the MIMO communication 125 across the network 126.

Other components 135 of the electronic device 100 may include a microphone, an earpiece speaker, a loudspeaker, key selection sensors, a touch pad sensor, a touch screen sensor, a capacitive touch sensor, and one or more switches. Touch sensors may be used to indicate whether any of the user actuation targets present on the flexible display 141 are being actuated. Alternatively, touch sensors disposed along the first device housing 102 and/or the second device housing 103 can be used to determine whether the electronic device 100 is being touched at side edges or major faces of the electronic device 100 by a surface, hands, keys, or other objects. The touch sensors can include surface and/or housing capacitive sensors in one embodiment.

The other components 135 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion. In one embodiment the motion detectors are also operable to detect movement, and direction of movement, of the electronic device 100 by a user.

In one or more embodiments, the other components 135 include a gravity detector. For example, as one or more accelerometers and/or gyroscopes may be used to show vertical orientation, constant, or a measurement of tilt relative to gravity. The other components 135 operable with the one or more processors 109 can include output components such as video outputs, audio outputs, and/or mechanical outputs. Examples of output components include audio outputs, an earpiece speaker, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein are one or more method steps illustrating how the components of the electronic device 100 of FIG. 1 can be used to perform dynamic MIMO antenna array (120) performance optimization based upon correlations between antenna elements (121,122,123, 124) of the MIMO antenna array (120). Beginning at step 201, a communication circuit (118) of the electronic device 100 is in communication with a terrestrial cellular tower 207 operated by a network service provider operating a communication network 126. As shown, the electronic device 100 is in the axially displaced open position. Accordingly, the separation between each antenna element (121,122,123,124) defining the MIMO antenna array (120) of the electronic device 100 has more than a half-wavelength of separation and is isolated. When in this configuration, the one or more processors (109) of the electronic device 100 select a quantity of antenna elements that includes all four antenna elements (121,122,123,124) to engage in MIMO communication 125 with the terrestrial cellular tower 207. In one or more embodiments, when this occurs and the electronic device 100 initiates the MIMO communication 125, the network service provider assigns 208 the electronic device 100 a rank indicator 209 of four due to the fact that there is enough spatial diversity between antenna element (121,122, 123,124) that four streams of MIMO communication 125 can be transmitted and received across the network 126.

At step 202, an authorized user 210 of the electronic device 100 transitions the electronic device 100 from the axially displaced open position of step 201 to the closed position of step 203. As previously explained, this results in less than a half-wavelength of separation between antenna element (121) and antenna element (123), and also between antenna element (122) and antenna element 124). At step 203, one or more sensors (129) of the electronic device 100 detect this triggering event 211 as altering a radiation correlation pattern between at least two antenna elements of the plurality of antenna elements (121,122,123,124) defining the MIMO antenna array (120).

At step 205, one or more processors (109) of the electronic device 100 select, in response to the one or more sensors (129) detecting the triggering event 211 at step 204, a quantity of antenna elements from the plurality of antenna elements (121,122,123,124) available for engagement in the MIMO communication 125 across the network 126 as a function of the radiation correlation pattern. This step 205 can include increasing a quantity of antenna elements selected from the plurality of antenna elements (121,122, 123,124) for use in the MIMO communication 125 across the network 126 when the triggering event 211 decreases radiation correlation patterns between at least two antenna elements of the plurality of antenna elements, or decreasing the quantity of antenna elements for use in the MIMO communication 125 across the network 126 when the triggering event 211 increases the radiation correlation patterns between the at least two antenna elements of the plurality of antenna elements (121,122,123,124), as previously described.

In this illustrative example, all four antenna elements (121,122,123,124) were engaged in the MIMO communication 125 across the network 126 at step 201. However, at step 203 the correlation between antenna element (121) and antenna element (123) has increased, as has the correlation between antenna element (122) and antenna element (124). Accordingly, at step 205 the one or more processors (109) of the electronic device 100 determine a correlation score for each antenna element of the plurality of antenna elements (121,122,123,124) in response to the one or more sensors (129) detecting the triggering event 211 at step 204. In one or more embodiments, step 205 comprises the one or more processors (109) determining the correlation score for each antenna element of the plurality of antenna elements (121, 122,123,124) in both an uplink direction and a downlink direction and comparing these correlation scores to one or more predefined correlation score thresholds.

In this illustrative example, the correlation score between antenna element (121) and antenna element (123) has increased above a first predefined correlation score threshold. Accordingly, the one or more processors (109) of the electronic device 100 preclude one of these antenna elements (121,123) from engaging in the MIMO communication 125 across the network 126. While either could be selected, in this example the one or more processors (109) preclude antenna element (123) from engaging in the MIMO communication 125 across the network 126. Since the correlation score between antenna element (122) and antenna element (124) has also exceeded this first predefined correlation score threshold, the one or more processors (109) similarly preclude antenna element (122) from engaging in the MIMO communication 125 across the network 126.

At step 206, the one or more processors (109) of the electronic device 100 optionally repeat the method steps of FIG. 2 to continually, and dynamically, optimize the performance of the MIMO antenna array (120) and/or perform one or more post optimization operations. Repeating the method steps ensures that the MIMO antenna array (120) continues to be optimized in response to each and every triggering event, thereby updating the correlation scores for each antenna element in response to each triggering event to determine whether a particular antenna element is suitable for engagement in the MIMO communication 125 across the network 126 in real time. If a better antenna element exists after a triggering event, it gets assigned to MIMO communication usage. Similarly, if an antenna element in use is suboptimal based upon the evaluation occurring at step 205, it is de-assigned from MIMO communication usage. Since this flow can repeat in each direction, i.e., uplink and downlink, the MIMO antenna map (131) can be maintained dynamically.

The post optimization operations of step 206 can take different forms. Turning now to FIG. 7, illustrated therein are a few such options.

In one or more embodiments, the one or more processors (109) of the electronic device (100) can notify 701 the network service provider that a different number of antenna element are now being used to engage in the MIMO communication (125) across the network (126). This would allow, for example, the network service provider to change the rank index assigned to the electronic device (100)— using the example from FIG. 2 above—from four to two.

While this is one viable option, embodiments of the disclosure contemplate that in many situations an electronic device will not elect to notify 701 the network service provider each time a triggering event alters the radiation correlation pattern of the antenna element defining a MIMO antenna array. This is true because unnecessary ping-ponging between the electronic device (100) and the network service provider may actually degrade communication efficiency more than, say, simply communicating with two antenna elements despite being assigned a rank indicator of four. If the triggering event is the transition of an electronic device from an axially displaced open position to a closed position, this may occur repeatedly within a short time span, leaving notification 701 unnecessary.

In some embodiments, the one or more processors (109) of the electronic device (100) can initiate a timer 702. Embodiments of the disclosure contemplate that some conditions may last longer than others. A person may flip an electronic device open and closed quickly. By contrast, a person may place an electronic device on a metal table and leave it there for a long time. Accordingly, in one or more embodiments the one or more processors (109) of the electronic device (100) initiate a timer 702 in response to performing a MIMO antenna array optimization. When the timer 702 expires, the one or more processors (109) may conclude that the condition resulting from the triggering event will last for a while. Accordingly, the one or more processors (109) may then take another action such as notifying 701 the network service provider that there has been a change in the number of antenna element engaged in the MIMO communication (125) across the network (126).

In a similar manner to initiating a timer 702, the one or more processors (109) of the electronic device (100) may use the one or more sensors (129) to monitor for an event 703 indicating that the recently applied MIMO antenna array optimization may be transitory or longer lasting. Illustrating by example, if two antenna elements of a MIMO antenna array become correlated due to an electronic device being placed near a metal object, the one or more processors (109) may use the one or more sensors (129) to monitor for motion, changes in temperature, changes in light incident upon the device housing of the electronic device, and so forth to determine whether the present condition will last. If, for instance, the electronic device is moving, this may mean that it is in a purse adjacent to keys, which suggests a shorter duration of the recently applied MIMO antenna array optimization due to the fact that a user may pull the electronic device from the purse for usage. By contrast, when the electronic device is stationary against a cold surface such as a metal table, this may indicate that the electronic device has been placed on a surface while the user is sleeping, for instance, thus indicating that the recently applied MIMO antenna array optimization will be in effect for a longer period of time.

The one or more processors (109) of the electronic device (100) may alter the rank indicator 704 or other user equipment capability message in response to the recently applied MIMO antenna array optimization. Embodiments of the disclosure contemplate that when a rank indicator 704 is greater than the number of antenna elements in use for MIMO communication, latency will increase, and throughput will decrease. However, since the one or more processors (109) are aware of the quantity of antenna elements engaged in the MIMO communication (125) across the network (126), they can cause the operating components associated with the unused antenna elements, e.g., signal drivers, amplifiers, and so forth, to enter a low-power or sleep mode. Thus, by leaving the rank indicator 704 alone, while communication may be a bit slower the one or more processors (109) can advantageously extend the runtime of the device. In other scenarios where communication speed is paramount, the one or more processors (109) may alter the rank indicator 704 or other messaging in response to the recently applied MIMO antenna array optimization.

Other post processing operations 705 will be obvious to those of ordinary skill in the art having the benefit of this disclosure. Illustrating by example, turning now to FIG. 4, the one or more processors (109) of the electronic device 100 may present a prompt 401 on an exterior display 402 of the electronic device 100 alerting the authorized user 210 of the electronic device 100 to the fact that a recently applied MIMO antenna array optimization has occurred. In this illustrative example, the prompt 401 indicates that the physical form factor of the electronic device 100 has caused an increased correlation between antenna elements (121,122, 123,124) of the MIMO antenna array (120), and that this may decrease communication speeds. However, it may also increase device runtime. In this illustrative example, the prompt 401 includes user actuation target allowing the authorized user 210 of the electronic device 100 to either accept this operating mode or, alternatively, to obtain help. By touching the help user actuation target, the one or more processors (109) may present another prompt requesting that the authorized user 210 transition the electronic device 100 from the closed position to the axially displaced open position to reduce the amount of spatial correlation between antenna elements (121,122,123,124) of the MIMO antenna array (120), and so forth.

Figure 3:
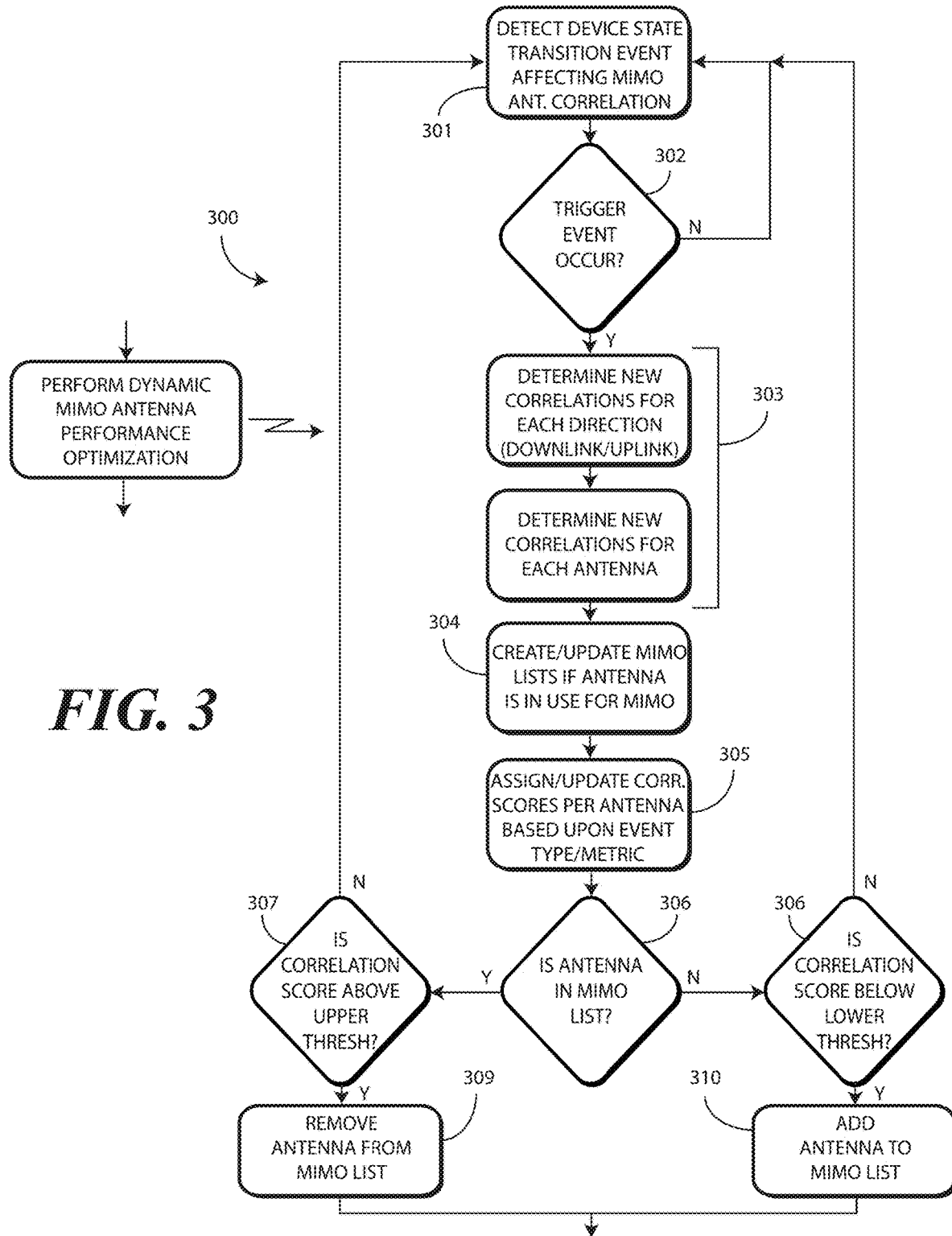
FIG. 3 illustrates another explanatory method in accordance with one or more embodiments of the disclosure.

Turning now to FIG. 3, illustrated therein is one explanatory method 300 in accordance with one or more embodiments of the disclosure. Beginning at step 301, the method 300 monitors for device state events that may affect the radiation correlation pattern between one or more antenna element included in a plurality of antenna element defining a MIMO antenna array. Examples of such device state events include a change in form factor of an electronic device, placement of an electronic device on a surface affecting a radiation pattern of one or more antenna elements of the MIMO antenna array, or other interactions with the electronic device that alter radiation correlation pattern between antenna elements of the MIMO antenna array. Decision 302 then determines whether a triggering event altering a radiation correlation pattern between at least two antenna elements of a plurality of antenna elements defining the MIMO antenna array occurs.

At step 303, the method 300 determines a correlation score for each antenna element of the plurality of antenna elements in response to the detection of the triggering event at decision 302. In one or more embodiments, step 303 comprises determining the correlation score for each antenna element of the plurality of antenna elements defining the MIMO antenna array in both an uplink direction and a downlink direction. As noted above, step 303 can include assigning a predefined correlation score to a particular antenna element based upon its physical condition, inferring a correlation score from the physical condition of the antenna element, measuring the correlation score of the antenna element while in the physical condition, or combinations thereof. Other techniques for determining correlation scores will be obvious to those of ordinary skill in the art having the benefit of this disclosure.

At step 304, the method 300 creates and/or updates a map of antenna elements available to engage in MIMO communication and stores this map in the memory of an electronic device. Step 305 can then include assigning and/or updating correlation scores for each antenna element of the MIMO antenna array using an envelope correlation coefficient or "ECC" based upon an identified metric associated with a triggering event.

Decision 306 then determines whether a particular antenna element is being used in the MIMO communication. If it is, decision 307 determines whether its correlation score is above a first predefined correlation score threshold. If it is, it is removed from engagement in the MIMO communication at step 309. In one or more embodiments, the first predefined correlation score threshold and the second predefined correlation score threshold are the same. In other embodiments, the first predefined correlation score threshold is greater than the second predefined correlation score threshold.

By contrast, if a particular antenna element is not being used in the MIMO communication, decision 306 determines whether its correlation score is below a second predefined correlation score threshold. If it is, it is added to the quantity of antenna elements engaged in the MIMO communication at step 310. Accordingly, the method 300 of FIG. 3 allows for excluding an antenna element in the quantity of antenna elements when the correlation score for the antenna element is above a first predefined correlation score threshold and including the antenna element in the quantity of antenna elements when the correlation score for the antenna element is below a second predefined correlation score threshold. Moreover, the method 300 allows for replacing a first antenna element in the quantity of antenna elements with a second antenna element having a lower correlation with other antenna elements included in the quantity of antenna elements.

Figure 8:
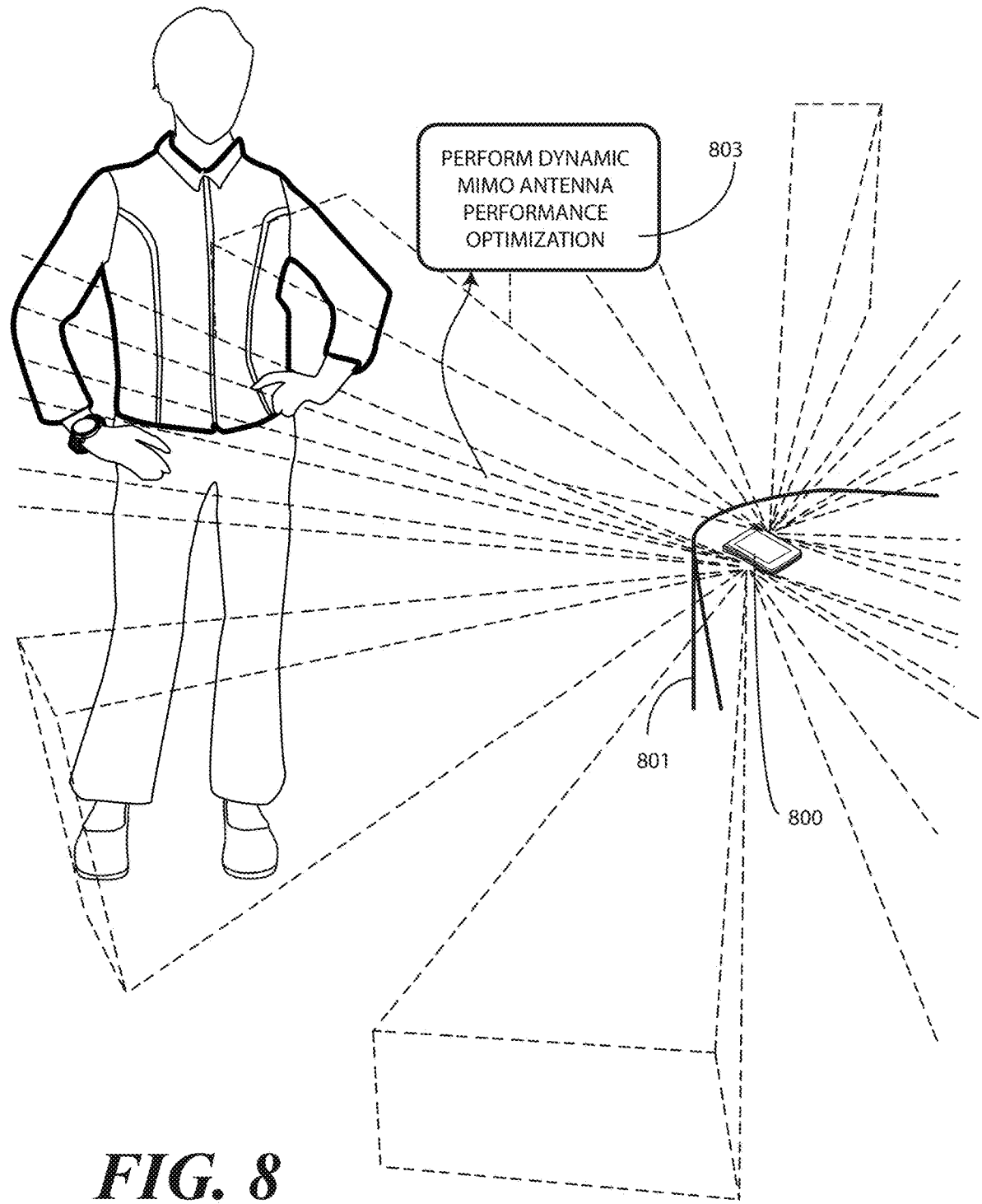
FIG. 8 illustrates one explanatory triggering event and corresponding method steps in accordance with one or more embodiments of the disclosure.
Figure 9:
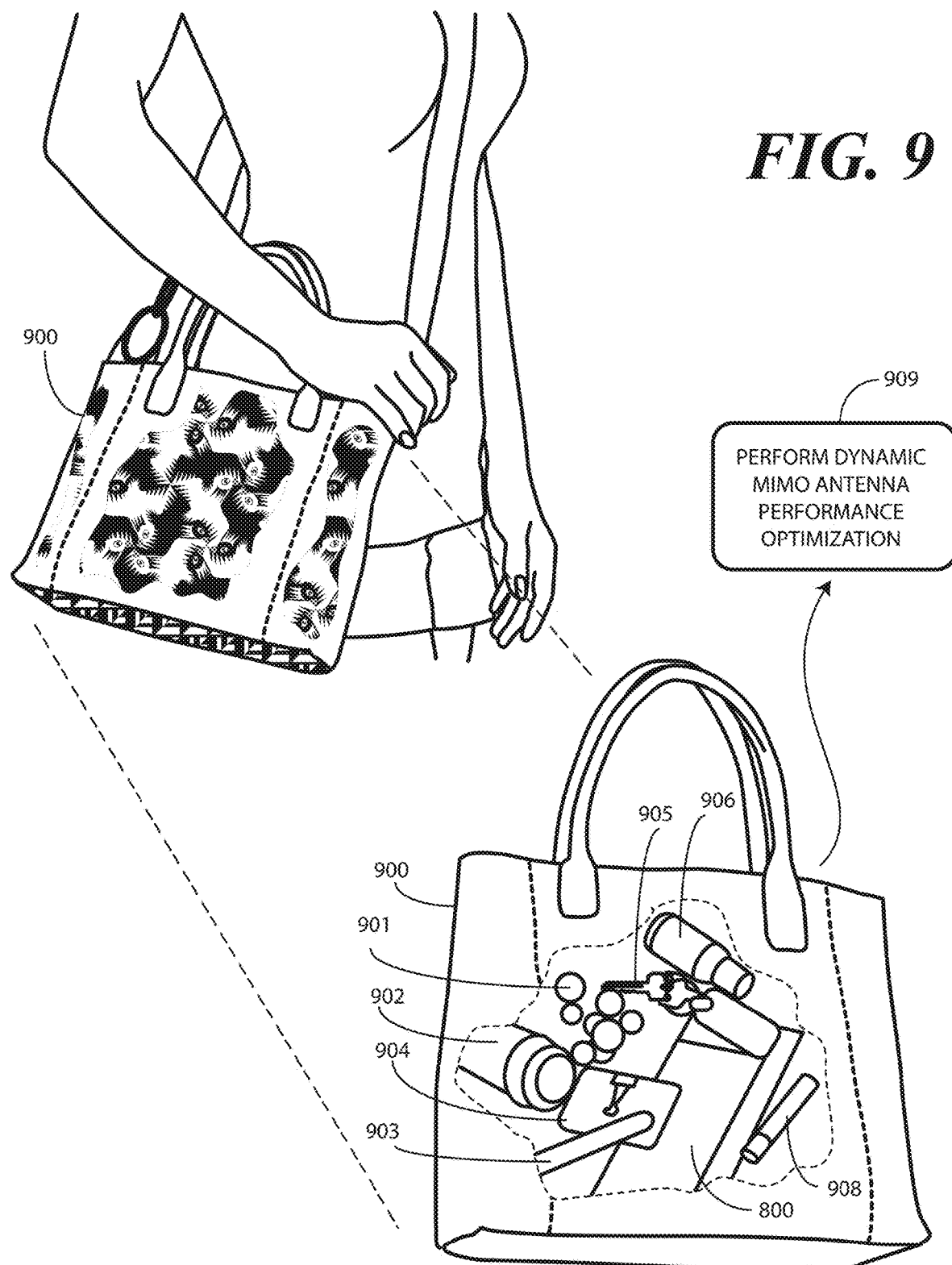
FIG. 9 illustrates another explanatory triggering event and corresponding method steps in accordance with one or more embodiments of the disclosure.

Turning now to FIGS. 8 and 9, illustrated therein are two additional triggering events contemplated by embodiments of the disclosure. In the example of FIG. 2 above, the electronic device (100) included a first device housing (102) pivotable about a hinge assembly (101) relative to a second device housing (103) between an axially displaced open position and a closed position. The electronic device (100) included a multiple input, multiple output antenna array (120) comprising a plurality of antenna elements (121,122, 123,124) configured for MIMO communication (125) across a network (126).

One or more processors (109) operable with the MIMO antenna array (120) then increased a quantity of antenna elements available to engage in the MIMO communication (125) when the electronic device (100) was in the axially displaced open position and decreased the quantity of antenna elements available to engage in the MIMO communication (125) when the electronic device (100) was in the closed position. This occurred because the plurality of antenna elements (121,122,123,124) comprised at least two antenna elements (121,122) situated in the first device housing (102) and at least two antenna elements (123,124) situated in the second device housing (103). The one or more processors (109) further determined a correlation score for each antenna element of the plurality of antenna elements (121,122,123,124) and decreased the quantity of antenna elements by removing antenna elements having a correlation score above a predefined threshold when the electronic device (100) was in the closed position.

By contrast, in FIG. 8 an electronic device 800 configured in accordance with one or more embodiments of the disclosure has been placed upon a metal table 801. Regardless of whether the electronic device 800 is a hinged electronic device as was the case in FIG. 1, a deformable electronic device as will be described in FIGS. 10-11 below, or a rigid "candy bar" device, embodiments of the disclosure contemplate that such physical placement will alter the radiation correlation pattern between at least two antenna elements of a plurality of antenna elements defining a MIMO antenna array. Accordingly, one or more processors of the electronic device can execute a method 803 where they select, in response to one or more sensors detecting the triggering event of being placed on the metal table 801, a quantity of antenna elements from the plurality of antenna elements available for engagement in the MIMO communication across the network as a function of the radiation correlation pattern.

Turning now to FIG. 9, in this example the triggering event is placement of the electronic device 800 into a purse 900. In this example, the purse 900 includes numerous items such as coins 901, medications 902, grooming items such as fingernail files 903, notecards 904, keys 905, lotions 906, notepads, lip balm 908, and other items. Some of these items, such as the coins 901 and keys 905, are metal and can affect the radiation correlation pattern between two antenna elements included in a plurality of antenna elements defining a MIMO antenna array of the electronic device 800. Accordingly, one or more processors of the electronic device can execute a method 909 where they select, in response to one or more sensors detecting the triggering event of being placed on the metal table 801, a quantity of antenna elements from the plurality of antenna elements available for engagement in the MIMO communication across the network as a function of the radiation correlation pattern.

Turning now to FIGS. 10-11, illustrated therein is an alternate electronic device 1000 suitable for use with the dynamic MIMO antenna array optimization methods described herein. Embodiments of the disclosure contemplate that an electronic device need not include a hinge for physical form factor alterations to affect a radiation correlation pattern between at least two antenna elements of a MIMO antenna array. The electronic device 1000 of FIGS. 10-11 is an alternate device that can benefit from the same optimization operations.

The electronic device 1000 of FIG. 10 is again a portable electronic device and includes a flexible display 1001. The explanatory electronic device 1000 of FIG. 10 also includes a housing 1002 supporting the flexible display 1001. In one or more embodiments, the housing 1002 is flexible. In one embodiment, the housing 1002 may be manufactured from a malleable, bendable, or physically deformable material such as a flexible thermoplastic, flexible composite material, flexible fiber material, flexible metal, organic or inorganic textile or polymer material, or other materials. Where the housing 1002 is a deformable housing, it can be manufactured from a single flexible housing member or from multiple flexible housing members. In other embodiments, the housing 1002 could be a composite of multiple components.

In one or more embodiments when the electronic device 1000 is deformed by a bend at a deformable portion 1003 of the electronic device 1000, this alters a radiation correlation pattern between at least two antenna elements of a MIMO antenna array carried by the electronic device 1000. Such a change in form factor therefore constitutes a triggering event. One or more processors of the electronic device 1000 can then increase a quantity of antenna elements selected from the plurality of antenna elements for use in MIMO communication across a network when the triggering event decreases radiation correlation patterns between at least two antenna elements of the plurality of antenna elements. Alternatively, the one or more processors can decrease the quantity of antenna elements for use in the MIMO communication across the network when the triggering event increases the radiation correlation patterns between the at least two antenna elements of the plurality of antenna elements.

The electronic device 1000 is shown in an undeformed configuration in FIG. 10, and in a fully deformed configuration in FIG. 11. More specifically, the geometry of the electronic device 1000 defines a plane in FIG. 10, while a first device housing portion 1101 is abutting a second device housing portion 1102 in FIG. 11. This changes the distance between antenna element of the MIMO antenna array situated in the first device housing portion 1101 and the second device housing portion 1102 due to the change in distance between those antenna elements. Accordingly, the method of FIG. 2 or the method (300) of FIG. 3 can be applied to the electronic device 1000 to optimize the performance of the MIMO antenna array as previously described.

Turning now to FIGS. 12-13, illustrated therein is yet another electronic device 1200 that can benefit from the MIMO antenna array optimization methods described herein. The electronic device 1200 of FIG. 12 is again a portable electronic device and includes a flexible display 1201. The explanatory electronic device 1200 of FIG. 12 also includes a first device housing 1202 that is slidable relative to a second device housing 1203. When this occurs, the flexible display 1201 rolls within the second device housing 1203 to facilitate the sliding action.

In one or more embodiments when the electronic device 1200 is transitioned from the open position of FIG. 12 to the closed position of FIG. 13, this alters a radiation correlation pattern between at least two antenna elements of a MIMO antenna array carried by the electronic device 1200. Such a change in form factor therefore constitutes a triggering event. One or more processors of the electronic device 1200 can then increase a quantity of antenna elements selected from the plurality of antenna elements for use in MIMO communication across a network when the triggering event decreases radiation correlation patterns between at least two antenna elements of the plurality of antenna elements. Alternatively, the one or more processors can decrease the quantity of antenna elements for use in the MIMO communication across the network when the triggering event increases the radiation correlation patterns between the at least two antenna elements of the plurality of antenna elements.

Figure 14:
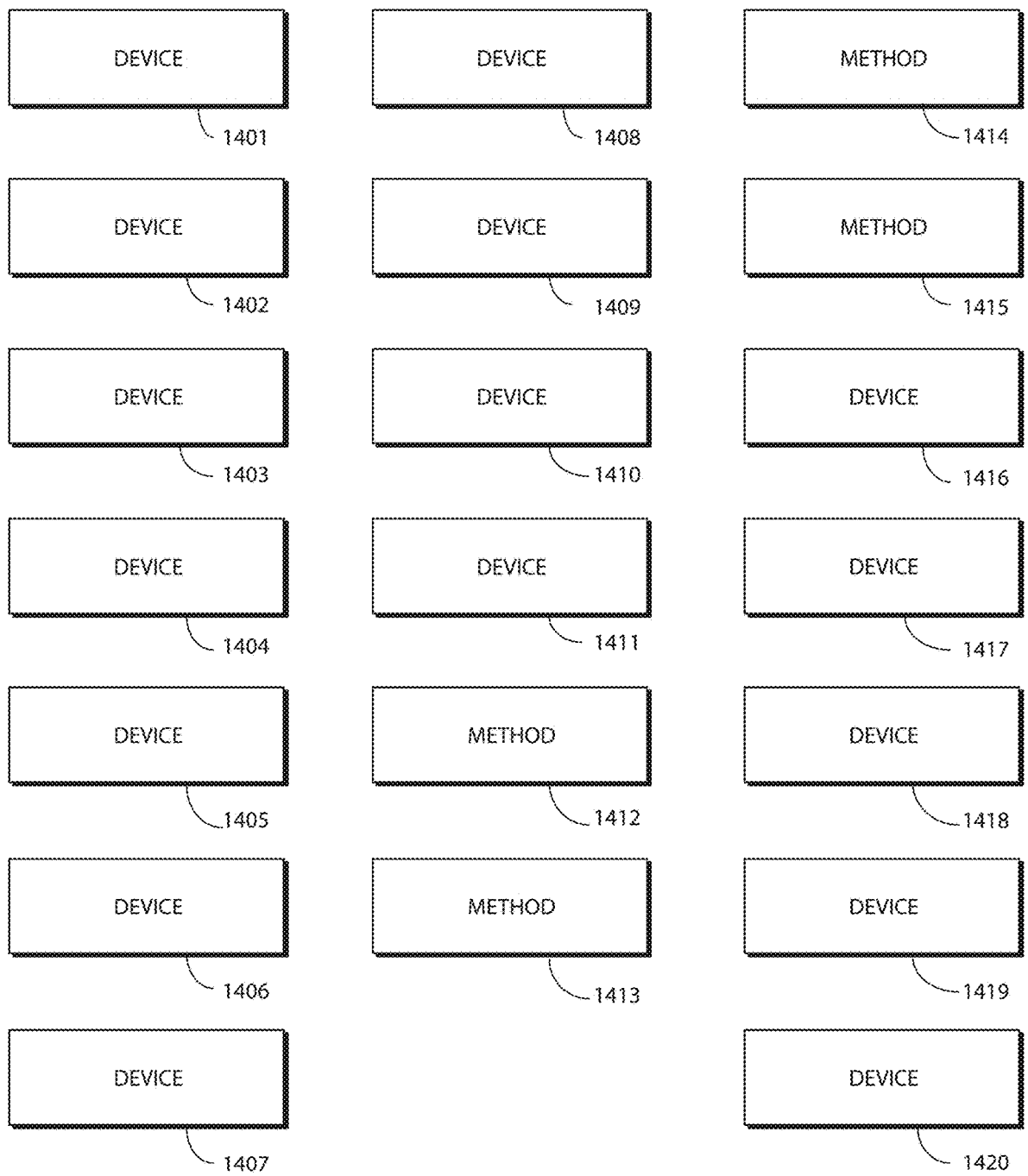
FIG. 14 illustrates various embodiments of the disclosure.

Turning now to FIG. 14, illustrated therein are various embodiments of the disclosure. The embodiments of FIG. 14 are shown as labeled boxes in FIG. 14 due to the fact that the individual components of these embodiments have been illustrated in detail in FIGS. 1-13, which precede FIG. 14. Accordingly, since these items have previously been illustrated and described, their repeated illustration is no longer essential for a proper understanding of these embodiments. Thus, the embodiments are shown as labeled boxes.

At 1401, an electronic device comprises a multiple input, multiple output (MIMO) antenna array comprising a plurality of antenna elements configured for MIMO communication across a network. At 1401, the electronic device comprises one or more sensors detecting a triggering event altering a radiation correlation pattern between at least two antenna elements of the plurality of antenna elements.

At 1401, the electronic device comprises one or more processors. At 1401, the one or more processors select, in response to the one or more sensors detecting the triggering event, a quantity of antenna elements from the plurality of antenna elements available for engagement in the MIMO communication across the network as a function of the radiation correlation pattern.

At 1402, the one or more processors of 1401 further determine a correlation score for each antenna element of the plurality of antenna elements in response to the one or more sensors detecting the triggering event. At 1403, the one or more processors of 1402 determine the correlation score for each antenna element of the plurality of antenna elements in both an uplink direction and a downlink direction.

At 1404, the one or more processors of 1402 exclude an antenna element in the quantity of antenna elements when the correlation score for the antenna element is above a first predefined correlation score threshold. At 1405, the one or more processors of 1404 include the antenna element in the quantity of antenna elements when the correlation score for the antenna element is below a second predefined correlation score threshold. At 1406, the first predefined correlation score threshold and the second predefined correlation score threshold of 1405 are the same.

At 1407, the one or more processors of 1405 include the antenna element in the quantity of antenna elements when the correlation score for the antenna element is at least one-half wavelength of a MIMO communication signal of the MIMO communication different from other correlation scores of other antenna elements included with the quantity of antenna elements.

At 1408, the electronic device of 1047 further comprises a memory operable with the one or more processors. At 1408, the one or more processors further update a map of antenna elements available to engage in the MIMO communication stored in the memory.

At 1409, the electronic device of 1401 comprises a first device housing pivotable about a hinge relative to a second device housing between a closed position and an axially displaced open position with at least two antenna elements situated in the first device housing and at least two other antenna elements situated in the second device housing. At 1409, the triggering event comprises the first device housing pivoting about the hinge relative to the second device housing.

At 1410, the triggering event of 1401 comprises placement of the electronic device on a surface. At 1412, the one or more processors of 1401 select the quantity of antenna elements available for engagement in the MIMO communication across the network by replacing a first antenna element in the quantity of antenna elements with a second antenna element having a lower correlation with other antenna elements included in the quantity of antenna elements.

At 1412, a method in an electronic device comprises detecting, with one or more sensors, a triggering event altering a radiation correlation pattern between at least two antenna elements of a plurality of antenna elements defining a multiple input, multiple output (MIMO) antenna array. At 1412, the method comprises increasing, using one or more processors in response to the one or more sensors detecting the triggering event, a quantity of antenna elements selected from the plurality of antenna elements for use in MIMO communication across a network when the triggering event decreases radiation correlation patterns between at least two antenna elements of the plurality of antenna elements and decreasing, using the one or more processors in response to the one or more sensors detecting the triggering event, the quantity of antenna elements for use in the MIMO communication across the network when the triggering event increases the radiation correlation patterns between the at least two antenna elements of the plurality of antenna elements.

At 1413, the increasing of 1412 occurs when the triggering event decreases the radiation correlation pattern between the at least two antenna elements of the plurality of antenna elements by at least a half wavelength of a MIMO communication signal used for the MIMO communication across the network.

At 1414, the method of 1412 further comprises determining a polarization of the at least two antenna elements. At 1414, the increasing occurs when the triggering event decreases the radiation correlation pattern between the at least two antenna elements only when a first polarization of a first antenna element is rotated relative to a second polarization of a second antenna element by at least a predefined rotation threshold.

At 1415, the method of 1412 further comprises updating, with the one or more processors in a memory of the electronic device, updating a map of antenna elements available for engagement in the MIMO communication. At 1416, the method of 1412 further comprises dynamically maintaining a table of correlation scores for each antenna element of the plurality of antenna elements by updating the table of correlation scores in response to the triggering event.

At 1417, an electronic device comprises a first device housing pivotable about a hinge relative to a second device housing between an axially displaced open position and a closed position. At 1417, the electronic device comprises a multiple input, multiple output (MIMO) antenna array comprising a plurality of antenna elements configured for MIMO communication across a network.

At 1417, the electronic device comprises one or more processors. At 1417, the one or more processors are operable with the MIMO antenna array and increase a quantity of antenna elements available to engage in the MIMO communication when the electronic device is in the axially displaced open position, while decreasing the quantity of antenna elements available to engage in the MIMO communication when the electronic device is in the closed position.

At 1418, the plurality of antenna elements of 1417 comprising at least two antenna elements situated in the first device housing and at least two antenna elements situated in the second device housing. At 1419, the one or more processors of 1417 determine a correlation score for each antenna element of the plurality of antenna elements, with the one or more processors decreasing the quantity of antenna elements by removing antenna elements having a correlation score above a predefined threshold. At 1420, the predefined threshold of 1419 is defined by a half wavelength of a MIMO communication signal used in the MIMO communication.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
    a multiple input, multiple output (MIMO) antenna array comprising a plurality of antenna elements configured for MIMO communication across a network;
    one or more sensors detecting a triggering event altering a radiation correlation pattern between at least two antenna elements of the plurality of antenna elements; and
    one or more processors selecting, in response to the one or more sensors detecting the triggering event, a quantity of antenna elements from the plurality of antenna elements available for engagement in the MIMO communication across the network as a function of the radiation correlation pattern.

2. The electronic device of claim 1, the one or more processors further determining a correlation score for each antenna element of the plurality of antenna elements in response to the one or more sensors detecting the triggering event.

3. The electronic device of claim 2, the one or more processors determining the correlation score for each antenna element of the plurality of antenna elements in both an uplink direction and a downlink direction.

4. The electronic device of claim 2, the one or more processors excluding an antenna element in the quantity of antenna elements when the correlation score for the antenna element is above a first predefined correlation score threshold.

5. The electronic device of claim 4, the one or more processors including the antenna element in the quantity of antenna elements when the correlation score for the antenna element is below a second predefined correlation score threshold.

6. The electronic device of claim 5, wherein the first predefined correlation score threshold and the second predefined correlation score threshold are the same.

7. The electronic device of claim 5, the one or more processors including the antenna element in the quantity of antenna elements when the correlation score for the antenna element is at least one-half wavelength of a MIMO communication signal of the MIMO communication different from other correlation scores of other antenna elements included with the quantity of antenna elements.

8. The electronic device of claim 7, further comprising a memory operable with the one or more processors, the one or more processors further updating a map of antenna elements available to engage in the MIMO communication stored in the memory.

9. The electronic device of claim 1, the electronic device comprising a first device housing pivotable about a hinge relative to a second device housing between a closed position and an axially displaced open position with at least two antenna elements situated in the first device housing and at least two other antenna elements situated in the second device housing, wherein the triggering event comprises the first device housing pivoting about the hinge relative to the second device housing.

10. The electronic device of claim 1, the triggering event comprising placement of the electronic device on a surface.

11. The electronic device of claim 1, the one or more processors selecting the quantity of antenna elements available for engagement in the MIMO communication across the network by replacing a first antenna element in the quantity of antenna elements with a second antenna element having a lower correlation with other antenna elements included in the quantity of antenna elements.

12. A method in an electronic device, the method comprising:
   detecting, with one or more sensors, a triggering event altering a radiation correlation pattern between at least two antenna elements of a plurality of antenna elements defining a multiple input, multiple output (MIMO) antenna array;
   increasing, using one or more processors in response to the one or more sensors detecting the triggering event, a quantity of antenna elements selected from the plurality of antenna elements for use in MIMO communication across a network when the triggering event decreases radiation correlation patterns between at least two antenna elements of the plurality of antenna elements; and
   decreasing, using the one or more processors in response to the one or more sensors detecting the triggering event, the quantity of antenna elements for use in the MIMO communication across the network when the triggering event increases the radiation correlation patterns between the at least two antenna elements of the plurality of antenna elements.

13. The method of claim 12, the increasing occurring when the triggering event decreases the radiation correlation pattern between the at least two antenna elements of the plurality of antenna elements by at least a half wavelength of a MIMO communication signal used for the MIMO communication across the network.

14. The method of claim 12, further comprising determining a polarization of the at least two antenna elements, the increasing occurring when the triggering event decreases the radiation correlation pattern between the at least two antenna elements only when a first polarization of a first antenna element is rotated relative to a second polarization of a second antenna element by at least a predefined rotation threshold.

15. The method of claim 12, further comprising updating, with the one or more processors in a memory of the electronic device, updating a map of antenna elements available for engagement in the MIMO communication.

16. The method of claim 12, further comprising dynamically maintaining a table of correlation scores for each antenna element of the plurality of antenna elements by updating the table of correlation scores in response to the triggering event.

17. An electronic device, comprising:
   a first device housing pivotable about a hinge relative to a second device housing between an axially displaced open position and a closed position;
   a multiple input, multiple output (MIMO) antenna array comprising a plurality of antenna elements configured for MIMO communication across a network; and
   one or more processors operable with the MIMO antenna array, the one or more processors increasing a quantity of antenna elements available to engage in the MIMO communication when the electronic device is in the axially displaced open position and decreasing the quantity of antenna elements available to engage in the MIMO communication when the electronic device is in the closed position.

18. The electronic device of claim 17, the plurality of antenna elements comprising at least two antenna elements situated in the first device housing and at least two antenna elements situated in the second device housing.

19. The electronic device of claim 17, the one or more processors further determining a correlation score for each antenna element of the plurality of antenna elements, the one or more processors decreasing the quantity of antenna elements by removing antenna elements having a correlation score above a predefined threshold.

20. The electronic device of claim 19, the predefined threshold defined by a half wavelength of a MIMO communication signal used in the MIMO communication.

* * * * *